(12) United States Patent
Audoly et al.

(10) Patent No.: US 8,743,124 B2
(45) Date of Patent: Jun. 3, 2014

(54) METHOD AND A SYSTEM FOR GENERATING A SYNTHESIZED IMAGE OF AT LEAST A PORTION OF A HEAD OF HAIR

(75) Inventors: Basile Audoly, Chatenay-Malabry (FR);
Bernard Querleux, Le Perreux (FR);
Florence Bertails, Meylan (FR);
Jean-Luc Leveque, Paris (FR);
Marie-Paule Cani, Meylan (FR)

(73) Assignee: Centre Nationale de Recherche Scientifique, Paris (FR)

( * ) Notice: Subject to any disclaimer, the term of this patent is extended or adjusted under 35 U.S.C. 154(b) by 1517 days.

(21) Appl. No.: 12/305,734

(22) PCT Filed: Jun. 22, 2007

(86) PCT No.: PCT/IB2007/052432
§ 371 (c)(1),
(2), (4) Date: Aug. 6, 2010

(87) PCT Pub. No.: WO2007/148306
PCT Pub. Date: Dec. 27, 2007

(65) Prior Publication Data
US 2010/0299106 A1 Nov. 25, 2010

Related U.S. Application Data

(60) Provisional application No. 60/815,572, filed on Jun. 22, 2006.

(51) Int. Cl.
*G06T 13/00* (2011.01)
(52) U.S. Cl.
USPC ................................. 345/473; 703/1

(58) Field of Classification Search
USPC ............................................. 345/473; 703/1
See application file for complete search history.

(56) References Cited

U.S. PATENT DOCUMENTS

| 5,404,426 A | 4/1995 | Usami et al. |
| 2002/0057278 A1 | 5/2002 | Bruderlin |
| 2002/0150287 A1 | 10/2002 | Kobayashi |
| 2003/0184544 A1* | 10/2003 | Prudent .......................... 345/419 |
| 2005/0251463 A1* | 11/2005 | Nagai et al. ...................... 705/27 |

FOREIGN PATENT DOCUMENTS

| EP | 1 635 298 A1 | 3/2006 |
| JP | A-4-190294 | 7/1992 |
| JP | A-5-61961 | 3/1993 |
| JP | A-8-153185 | 6/1996 |
| JP | A-2004-206329 | 7/2004 |
| JP | A-2006-79619 | 3/2006 |

OTHER PUBLICATIONS

Hadap, Sunil, and Nadia Magnenat-Thalmann. "Modeling dynamic hair as a continuum." In Computer Graphics Forum, vol. 20, No. 3, pp. 329-338. Blackwell Publishers Ltd, 2002.*

(Continued)

*Primary Examiner* — Maurice L McDowell, Jr.
(74) *Attorney, Agent, or Firm* — Oliff PLC

(57) ABSTRACT

The invention relates to a method of generating at least one synthesized image of at least a portion of a head of hair in movement, the method comprising the steps consisting in calculating a shape of at least one director hair by applying to the at least one director hair at least one mechanical model of an inextensible rod having inertia and stiffnesses in twisting and in bending, and in generating at least one virtual image of the at least one portion of the head of hair from the shape of the director hair.

20 Claims, 10 Drawing Sheets

(56) References Cited

OTHER PUBLICATIONS

References Ward, Kelly, Ming C. Lin, L. Joohi, Susan Fisher, and Dean Macri. "Modeling hair using level-of-detail representations." In Computer Animation and Social Agents, 2003. 16th International Conference on, pp. 41-47. IEEE, 2003.*

Kong, Waiming, and Masayuki Nakajima. "Generation of 3d hair model from multiple pictures." The Journal of the Institute of Image Information and Television Engineers 52, No. 9 (1998): 1351-1356.*

Lee, Doo-Won, and Hyeong-Seok Ko. "Natural hairstyle modeling and animation." Graphical Models 63, No. 2 (2001): 67-85.*

Keiser, Richard, Bart Adams, Dominique Gasser, Paolo Bazzi, Philip Dutré, and Markus Gross. "A unified lagrangian approach to solid-fluid animation." In Point-Based Graphics, 2005. Eurographics/IEEE VGTC Symposium Proceedings, pp. 125-148. IEEE, 2005.*

Hadap et al.; "Modeling Dynamic Hair as a Continuum;" *Eurographics*; 2001; pp. 329-338; vol. 20; No. 3.

Pai; "Strands: Interactive Simulation of Thin Solids using Cosserat Models;" *Eurographics*; 2002; pp. 347-352; vol. 21; No. 3.

Lee et al.; "Natural Hairstyle Modeling and Animation;" *Graphic Models*; 2001; pp. 67-85; vol. 63; No. 2.

Matusik et al.; "Image-Based 3D Photography using Opacity Hulls;" *ACM Transactions on Graphics*; 2002; pp. 427-437;.vol. 21; No. 3.

Rosenblum et al.; "Simulating the Structure and Dynamics of Human Hair: Modelling, Rendering and Animation;" *The Journal of Visualization and Computer Animation*; 1991; pp. 141-148; vol. 2.

Plante et al.; "A Layered Wisp Model for Simulating Interactions inside Long Hair." 2001; pp. 139-148.

Anjyo et al.; "A Simple Method for Extracting the Natural Beauty of Hair." 1992; pp. 111-120.

Daldegan et al.; "An Integrated System for Modeling, Animating and Rendering Hair;" *Computer Graphics Forum*; 1993; pp. 211-221.

Chang et al.; "A Practical Model for Hair Mutual Interactions;" Department of Computer Science, University of Illinois at Urbana-Champaign; 2002; pp. 73-80.

Bertails et al.; "Super-Helices for Predicting the Dynamics of Natural Hair;" 2006.

Kishi et al., "Development of Hair Style Designing System Using Tuft Model", Institute of Image Information and Television Engineers, Technical Report, Feb. 20, 1998, pp. 67-74, vol. 22, No. 12 (with abstract).

Kobayashi et al, "Motion Model for Threadlike Objects and Its Simulation by Computer Graphics", Institute of Electronics, Information and Communication Engineers, Research Report, Feb. 15, 1991, pp. 15-20, vol. 90, No. 434 (with abstract).

Japanese Office Action dated Dec. 12, 2011 issued in Japanese Patent Application No. 2009-516053 (with translation).

* cited by examiner

Left: horizontal oscillations of a clump of straight hair. Right: simulation using a simple Super-Helix Left: horizontal oscillations of a clump of curly hair. Right: simulation using a simple Super-Helix Left: stretching a clump of curly hair. Right: simulation using a simple Super-Helix Left: horizontal oscillations of a clump of straight hair with a curl near the end induces a twisting motion. Right: the effect is captured by our simulation using a simple Super-Helix Left: vertical oscillations of a clump of straight hair; downwards acceleration at beginning of descent causes the clump to bend. Right: the effect is captured by our simulation using a simple Super-Helix

METHOD AND A SYSTEM FOR GENERATING A SYNTHESIZED IMAGE OF AT LEAST A PORTION OF A HEAD OF HAIR The present invention relates to methods and systems for simulating the appearance of at least a portion of a head of hair.

By "appearance" is meant the shape of a hair, or a head of hair, implanted in the scalp of a person and subject to the gravitational field, simulation of the shape being complemented, where appropriate, by simulation of the color of the hair or the texture of the hair.

Realistic hair simulation is one of the most difficult issues when animating virtual humans. Human hair is a very complex material, consisting of hundreds of thousands of very thin, inextensible strands that interact with each other and with the body. Unlike solids or fluids, which have been studied for over a century and which are well modeled by now classical equations, hair remains a largely unsolved problem described by no well-accepted model.

Modeling hair dynamics raises a number of difficulties. First, each individual strand has complex nonlinear mechanical behavior, strongly related to its natural shape: smooth, wavy, curly, or fuzzy. Second, the dynamics of a set of strands takes on a collective behavior. Lastly, the simulation of a full head of hair raises obvious issues in terms of efficiency.

Three families of computational, models have been used for simulating the dynamics of individual hair strands in the prior art:
  Mass-spring systems as described in Rosenblum et al., "Simulating the structure and dynamics of human hair: Modeling, rendering, and animation", *The Journal of Visualization and Computer Animation* 2, 4, 141-148, 1991 and Plante et al., "A layered wisp model for simulating interactions inside long hair", in *EG CAS '01*, Springer, Computer Science, 139-148, 2001;
  two dimensional projective dynamics as described in Anjyo et al., "A simple method for extracting the natural beauty of hair", 111-120, 1992, in Daldegan et al., "An integrated system for modelling, animating and rendering hair", *Computer Graphics Forum* 12, 3, 211-221, 1993 and in Lee and Ko, "Natural Hairstyle modelling and animation", *Graphical Models* 63, 2 (March), 67-85, 2001;
  chains of rigid bodies as described in Hadap and Magnenat-Thalmann, "Modeling dynamic hair as a continuum", *Computer Graphics Forum (Eurographics '01)* 20, 3, 329-338, 2001 and in Chang et al., "A practical model for hair mutual interactions", in *ACM SIGGRAPH Symposium on Computer Animation*, 73-80, 2002.

The first family of models is well suited for animating long, extensible wisps or locks of hair.

The second efficiently handles non-stretchable straight hair.

The last increases realism by handling the twisting motion of hair strands while still preventing stretching.

Although those models have led to very nice visual results, several important hair features have not yet been taken into account. For instance, the deformations of curly hair are quite specific compared to straight hair, but previous work has simply simulated straight extensible hair wisps, with curly strands used only for rendering.

Moreover, none of the previous models demonstrated non-linear behaviors such as bending-twisting instabilities or buckling, which have a great impact on realism.

SUMMARY OF THE INVENTION

There exists a need for a system or method of simulating the movement of a hair, or a head of a hair, in a manner that may be useful in the field of cosmetics for example.

There also exists a need for using new methods of simulating the movement of a hair, or a head of a hair, in the field of animation, in particular in computer animation, for a movie or a video game, for example.

There also exists a need to facilitate the characterization of human hairs, whether natural or treated.

The present invention aims to satisfy some or all of these needs and to model hair dynamics accurately while keeping computational costs reasonable.

In one of its aspects, the invention provides a method of generating at least one synthesized image of at least a portion of a head of hair in movement, the method comprising:
  calculating the shape of at least one director hair by applying to said director hair at least one mechanical model of an inextensible rod having inertia and stiffnesses in twisting and in bending; and
  generating at least one synthesized image of the portion of the head of hair from the shape of the director hair as calculated in this way.

The term "synthesized" is synonymous of "virtual".

The term "director hair" is used to mean a hair modeled using a rod mechanical model in accordance with the invention, that moves in a way suitable for determining the movement of a portion of the head of hair comprising one or more locks, or of one or more target hairs.

Exemplary embodiments of the invention may allow to calculate the shape of a plurality of director hairs, with the number of director hairs possibly lying in the range 50 to 200, for example.

Unlike prior art in hair animation, the present invention may enable virtual hair to be parameterized from measured features, yielding realistic simulations as depicted in BERTAILS et al., "Super-Helices for Predicting the Dynamics of Natural Hair", *ACM Translation Graphics SIGGRAPH*, August 2006, which is incorporated by reference.

At least one the synthesized image of the hair, for example a sequence of images, may be incorporated into at least one image of a human head, which may be a real image or a 3D image.

Exemplary implementations of a method in accordance with the invention may be employed in the context of advising a customer and/or studying the effects of a hair-care composition and/or promoting a hair-care composition and/or training professionals such as hairdressers or beauticians, for example.

The method of the invention may also be implemented in the context of animating the hair of a character, of an animal, or of a virtual object integrated in an animation, for example an animated film, a cartoon, an advertising spot, a video game, or indeed an animated sequence broadcast on a computer medium or over a network, such as the Internet for example.

The method of the invention may be used for generating at least one sequence of images, the images being obtained by superposing images obtained by any image-sensor means, e.g. a video camera, on synthesized images obtained by using the method for generating at least one synthesized image of at least a portion of a head of hair in movement, as defined above.

Implementations of a method of the invention may also make it possible to create at least one sequence of synthesized images having a representation that is substantially similar to at least one sequence of real images.

The invention may make it possible to reproduce the movement of the head of hair of an individual, or of hair on an animal or an object by using at least one sequence of synthesized images resembling one or more sequences of real images of the head of hair of an individual, or hair on an animal or an object.

The sequence of real images may correspond to a sequence of filmed images, e.g. using a video camera, for example a camera forming part of a mobile telephone.

The term "head of hair of an individual" should be understood as covering not only the hair on an individual's head, but any other collection of hairs on the body of an individual. The term "hair of an animal" should be understood as covering any set of hairs on an animal, whether a mane or otherwise, and also any set of feathers or of barbs on a single feather.

The term "hair of an object" should be understood as covering any set of thread-like elements intended to simulate or represent a shape substantially similar to the head of hair of an individual or hair on an animal. The virtual object may, for example be personified and as a result may have a head of hair, for example when the object is intended to represent an avatar.

Exemplary embodiments of the intention may use at least one synthesized image obtained by the method of the invention in an animated film, for a synthesized character, in an interactive system, e.g. a video game, or to represent a head of hair of an avatar.

Depending on the parameters chosen for the rod mechanical model, the shape of the hair may be determined when the hair is stationary or when it is being moved by the action of an external force, for example a force exerted by the wind or by a movement of the head when the person is moving. The invention may allow to take into account in the simulation collision between locks of hair and on forces exerted by objects such as combs or other parts of the body.

In exemplary implementations, Kirchhoff equations for dynamic, inextensible elastic rods are used for accurately predicting hair motion. These equations fully account for the nonlinear behavior of hair strands with respect to bending and twisting.

Exemplary implementations of the invention provide a robust solution to the problem of simulating a hair, or a head of a hair, through the use of the dynamics of Cosserat rods.

The method of the invention may be used to simulate the behavior of several hair strands, for example by applying the rod mechanical model to each of the hairs.

At least one synthesized image of at least one portion of a head of hair in movement may be generated from at least one physical parameter of a portion of a real head of hair.

At least one synthesized image of at least a portion of a head of hair in movement may be generated from at least two source images of at least a portion of a head of hair. The source images may be photographic or video images, sketches, drawings or synthetized images. The source images may be part of a scenario for a movie or a video game or images already existing in a movie or video.

Exemplary embodiments of the invention comprise displaying on a single screen at least one synthesized image and at least one element for adjusting a simulation parameter of the rod mechanical model.

Exemplary embodiments of the invention may enable a user to select at least one simulation parameter of the rod mechanical model as a function of at least one physical characteristic of a portion of a real head of hair, for example as a function of the curly or straight appearance of the portion of the real head of hair.

Generating the Portion of a Head of Hair from Director Hairs

The portion of the head of hair may be rendered for simulation by using target hairs having movement that is associated with the movement of one or more director hairs.

The term "target hair" is used to mean any virtual hair associated with one or more director hairs, or with a lock, while rendering the portion of the head of hair, and presenting movement that is determined by the movement of one or more director hairs.

In an exemplary implementation of the invention, a director hair is associated with at least one lock of target hairs to which the movement of the associated director hair is given.

In a variant, each director hair is associated with a respective lock of target hairs to which the movement of the associated director hair is given. By way of example, this may make it possible to model heads of hair that are clearly separated into packets of hair, for example heads of hairs that are curly, wavy, or plaited.

In another exemplary implementation of the invention, a plurality of director hairs are associated with a set of target hairs, and weights may be given to the director hairs associated with the same set of target hairs, the weights may depend on the hair strand in the set of target hairs.

If a given director hair has a preponderant weight then the set of target hairs will tend to remain grouped around the director hair and may, for example, be little influenced by the other director hairs during the animation.

If the weights of the various director hairs on each target hair are balanced, then the packet of target hairs constituting the set of target hairs will tend to take on the appearance, during the animation, of a continuum between the various director hairs. This may make it possible, for example, to model a head of hair presenting an appearance that is continuous and smooth.

The weights of the director hairs that are associated with each target hair may be determined as a function of the distance between the root of a given target hair (in the set of target hairs) and the root of at least one director hair and/or as a function of the distance between the free end of a given target hair (in the set of target hairs) and the free end of at least one director hair. The second condition may be useful to prevent from interpolating hair between two director hairs which have free ends located across an obstacle (for example across the shoulder).

The weights of the director hairs that are associated with the set of target hairs may be determined as a function of the distance between the free end of a given target hair and the free end of at least one director hair in the set of target hairs and/or as a function of the distance between the root of a given director hair and the root of at least one target hair in the set of target hairs.

A zero weight may be given to a director hair when at least one of those two distances, between the roots of a director hair and a target hair or between their respective free ends, exceeds a predefined value.

In an exemplary implementation of the invention, an algorithm for determining the shape of a given target hair during a rendering step may be as follows:

Let $h$ be the target hair of shape that is to be calculated.

1) During a precalculation step, $\underline{h}$ is assigned to a main director hair $g_{main}$, also written $g_0$, and to other director hairs $g_i$, $i \in [1 \ldots n_g]$, which are selected to be sufficiently close to the main director hair $g_{main}$ on the scalp, complying with a maximum distance threshold $t^r$ that is always selected to be greater than the distance between the main director hair $g_{main}$ and the target hair h on the scalp. By way of example, this threshold may be set to a value that makes it possible to select not only the main director hair $g_{main}$, but also from 3 to 10 neighboring director hairs, for example.

The initial weight of each director hair on the target hair h may then be calculated as a normalized function of the Euclidean distance on the scalp between the target hair h and the various director hairs $g_i$:

$$\forall i \in [0 \ldots n_g], w_i^0 = \frac{t^r - d_i^r}{t^r};$$

where $d_i^r$ are the Euclidean distances between the roots of the director hairs $g_i$ and the root of the target hair h.

2) Thereafter, on each time step:
the distances of the director-hairs $g_i$ from the director hair $g_{main}$ during the movement are observed. Since hairs are freer to move apart close to their tips than close to their roots, this relative movement apart between director hairs may be measured by the distances between their tips. For each director hair $g_i$, the distance $d_i^e$ between the free end of the director hair $g_i$ and the free end of the director hair $g_{main}$ may be calculated. The weights given to each director hair may then be multiplied by a coefficient that is a decreasing function of the distance and that is piecewise linear:

$$\text{if } 0 \leq d_i^e < t_a(s_j),$$
$$w_{i,j} = w_i^0;$$
$$\text{if } t_a(s_j) \leq d_i^e < t_b(s_j),$$
$$w_{i,j} = w_i^0 \cdot \frac{t_b(s_j) - d_i^e}{t_b(s_j) - t_a(s_j)};$$
$$\text{else } w_{i,j} = 0;$$

where the two thresholds $t_a$ and $t_b$ may depend linearly on the arc length $s_j$ along the target hair h. This three-dimensional dependence along the hair may serve for example to guarantee interpolation of the hairs close to their roots while preserving an appearance of disjoint locks close to the tips.

The position of the target hair h at the arc length s may then be calculated as follows:

$$p_{h,j} = \frac{1}{\lambda} \cdot \sum_k w_{k,j} \cdot p_{k,j}$$

where $p_{k,j}$ is the point on the director hair $g_k$ at the arc length $s_j$, using the conventional $g_{main} = g_0$, and $$\lambda = \sum_k w_{k,j}.$$

The algorithm described above makes it possible to generate a portion of a head of hair from a set of director hairs changing smoothly from full interpolation along the director hairs to no interpolation at all (yielding distinct hair clusters), an intermediate state being characterized by a certain degree of interpolation near the roots, and no interpolation near the free ends of the director hairs.

In practice, the tuning of the parameters of the interpolation may for example be guided by the level of curliness of the director hairs: for example, one may choose full interpolation for straight hair (for a smooth overall aspect), semi-interpolation for wavy hair (for a smooth aspect near the roots, clumpy near the tips), and no interpolation for curly hair (for a clumpy aspect from roots to tips).

Rod Mechanical Model

The rod mechanical model of the invention is a mechanical model of an inextensible rod having inertia and stiffnesses in twisting and in bending.

The model may be a discretized version of an continuous unshearable rod model.

An example of a rod modeled using the method of the invention may comprise a succession of rod elements, each rod element possibly being a model of a rod having constant twisting and bending.

The term "rod element" may be used to cover any helically-shaped element, and also any degenerate element in the form of an arc of a circle and/or a straight segment.

The motion of rod elements may be coupled during the overall animation of the rod as a whole.

FIG. 9 shows an implementation of the rod mechanical model of the invention. A hair, or a portion of a head of hair can be modeled by a rod T made up for example of ten different rod elements $S_1 \ldots S_{10}$, each of which may be is animated or not. The rod T may for example model one hair, or a portion of a head of hair that is stiff (a), wavy (b), curly (c), or very curly (d).

The rod may be constituted by helically-shaped elements, with the number of elements lying for example in the range 1 to 10.

The number of degrees of freedom of the rod mechanical model may range for example from 2 to 100, and better from 20 to 50.

By way of example, the rod mechanical model is built upon the Cosserat and Kirchhoff theories of rods.

The term "rod" is used to mean an elastic material that is effectively one dimensional: its length is much greater than the size of its cross section.

The rod is considered to be an inextensible rod of length L, and s, lying in the range 0 to L, is the arc length along the rod.

The centerline, r(s,t), is the curve passing through the center of mass of every cross section. This curve describes the shape of the rod at a particular time t but it does not tell how much the rod twists around its centerline. In order to keep track of twist, the Cosserat model introduces a material frame $n_i(s,t)$ at every point of the centerline, as shown in FIG. 11. By "material" is meant that the frame "flows" along with the surrounding material upon deformation. By convention, $n_0$ is the tangent to the centerline:

$$r'(s,t) = n_0(s,t) \tag{1a}$$

while $(n_\alpha)_{\alpha=1,2}$ span the plane of the cross section. Primes are used to denote spatial derivatives along the center line, $f' = \partial f/\partial s$, while the dot notation is for time derivatives, $\dot{f} = df/dt$.

The Kirchhoff model for elastic rod starts from this mathematical description of a Cosserat curve and adds the physical requirement of inextensibility and unshearability. In this case, the frame $(n_i(s))_{i=0,1,2}$ is orthonormal for all s, and there exists a vector $\Omega(s,t)$, called the Darboux vector, such that:

$$n'_i(s,t) = \Omega(s,t) \times n_i(s,t) \text{ for } i=0,1,2. \tag{1b}$$

Appropriate boundary conditions must be specified: For example, one end of the hair strand, s=0, is clamped in the head while the other end, s=L, is the tip is which is stress free.

The position of the embedded end, together with the orientation of the initial frame, are imposed by head motion:

$$\left\{\begin{array}{l} r(0,t) = r_c(t) \\ n_i(0,t) = n_{i,c}(t) \end{array}\right\} \text{ for } i = 0, 1, 2 \quad (1c)$$

where subscript 'c' refers to the embedded end of the rod, s=0.

'Different boundary conditions, such as free boundary conditions on both ends for instance, can be handled by considering as unknowns the endpoint linear acceleration $\ddot{r}_c(s=0,t)$ and rotational acceleration $\dot{\phi}(s=0,t)$, and determining them at every timestep by solving the equations for the internal force and moment at this endpoint, these equations being linear with respect to these linear and rotational accelerations. The linear and rotational velocities and the position and orientation of the endpoint s=0 can then be determined from these accelerations by integrating kinematical equations. Such boundary conditions can be useful, for instance, to assemble several inextensible rods in a chain-like, or tree-like geometry; the boundary conditions at the endpoints of each inextensible rods would then express the continuity of displacement, and the balance of force and moments on the joints.'

The rod's material curvatures $(\kappa_\alpha(s,t))_{\alpha=1,2}$ with respect to the two directions of the cross section and its twist $\tau(s,t)$ are defined as the coordinates of the vector $\Omega(s,t)$ in the local material frame:

$$\Omega(s,t) = \tau(s,t)n_0(s,t) + \kappa_1(s,t)n_1(s,t) + \kappa_2(s,t)n_2(s,t). \quad (2)$$

By introducing a redundant notation for twist, $\kappa_0 = \tau$, it can be referred to these parameters collectively as $((\kappa_i(s,t))_{i=0,1,2}$.

The degrees of freedom of a Kirchhoff rod are its material curvatures and twist $((\kappa_i(s,t))_{i=0,1,2}$.

The spatial discretization may be done as follows:

The strand $s \in [0,L]$ is divided into N rod elements $S_Q$ as shown in FIG. 9 (which may also be called segment) indexed by Q ($1 \leq Q \leq N$). These rod elements may have different lengths, and N is an arbitrary integer, $N \geq 1$. The material bends and twist of the deformable model are defined with piecewise constant functions over these rod elements. $q_{i,Q}(t)$ is the constant value of the curvature $\kappa_i$ (for i=1, 2) or twist $\kappa_0 = \tau$ (for i=0) over the rod element $S_Q$ at time t. Therefore, an explicit formula for the material curvature and twist reads:

$$\kappa_i(s,t) = \sum_{Q=1}^{N} q_{i,Q}(t) \cdot \chi_Q(s) \quad (3)$$

where $\chi_Q(s)$ is the characteristic function of rod element Q, equal to 1 if $s \in S_Q$, and 0 otherwise. The numbers $q_{i,Q}(t)$ are collected into a vector q(t) of size 3N, which is called the generalized coordinates of the model.

These generalized coordinates q(t) may be used to reconstruct the rod shape at any given time. Indeed, plugging equation (3) into equation (2), and then equation (2) into equations (1a-1c) yields a differential equation with respect to s. By integrating this equation, the centreline r(s) and the material frames $n_i(s)$ are obtained as a function of s and of q(t).

'The functions thus obtained have the following smoothness: the functions $\kappa_i(s,t)$ are piecewise constant with respect to s and may be discontinuous at the edge between segments. The functions $n_i(s,t)$ are continuous with respect to the variable s. The function r(s,t) is continuous with continuous derivatives with respect to the variable s.

By patching the solutions, it may be found that the model deforms as a helix over every element, and such a model of the invention may be called a Super-Helix. $r^{SH}(s,q)$ and $n_i^{SH}(s,q)$ represent the parameterization of the Super-Helix in terms of its generalized coordinates q.

Symbolic Expression for the Super-Helix

The reconstruction of the Super-Helix can be carried out symbolically over any particular element. $S_Q = [s_Q^L, s_Q^R]$, over which the functions $(\kappa_i(s))_i$ are constant by construction. By equations (1), $\Omega' = \Sigma_i \kappa_i' n_i + \Omega \times \Omega = 0$, which means that the Darboux vector is constant along each element. For a given element Q, let $|\Omega|$ be the norm of the vector $\Omega$ and $\omega = \Omega/|\Omega|$ the unit vector aligned with $\Omega$ (the case $\Omega = 0$) is considered separately, see below). Finally, we write $a^\parallel = (a \cdot \omega)\omega$ and $a^\perp = a - a^\parallel$ as the projection of an arbitrary vector a parallel to and perpendicular to the axis spanned by $\omega$, respectively.

Since $\omega$ is constant, integration of equation (1b) over an element is straight-forward. The material 'frame' rotates around $\omega$ with a constant rate of rotation $|\Omega|$ per unit of curvilinear length. Therefore, the material frame at coordinate $s \in S_Q$ is obtained from the material frame $n_{i,L}^Q = n_i(s_Q^L)$ given on the left-hand side of the interval $S_Q$, by a rotation with angle $|\Omega|(s - s_Q^L)$ and axis parallel to $\omega$:

$$n_i(s) = n_{i,L}^{Q\parallel} + n_{i,L}^{Q\perp} \cos(|\Omega|(s - s_L^Q)) + \omega \times n_{i,L}^{Q\perp} \sin(|\Omega|(s - s_L^Q)).$$

By equation (1a), the centerline r(s) is then found by spatial integration of $n_0(s)$:

$$r(s) = r_L^Q + n_{0,L}^{Q\parallel}(s - s_L^Q) + n_{0,L}^{Q\perp} \frac{\sin(|\Omega|(s - s_L^Q))}{|\Omega|} + \omega \times n_{0,L}^{Q\perp} \frac{1 - \cos(|\Omega|(s - s_L^Q))}{|\Omega|}.$$

where $r_L^Q = r(s_Q^L)$ is the prescribed position of the centerline on the left-hand side of the interval. These equations provide the explicit reconstruction of an element. Its centerline, is a helix with axis parallel to $\omega$. This derivation is equivalent to the famous Rodrigues' formula. Two degenerate cases are possible and must be considered separately: the curve is an arc of circle when $\tau = 0$ and $\kappa_1 \neq 0$ or $\kappa_2 \neq 0$; it is a straight line when $\kappa_1 = \kappa_2 = 0$, which can be twisted ($\tau \neq 0$) or untwisted ($\tau = 0$, implying $\Omega = 0$).

The equations just derived can be used to propagate the centerline and the material frame from the left-hand side $s_Q^L$ of the element to its right-hand side $s_Q^R$. The whole rod can then be reconstructed by applying this procedure over every element successively, starting from the scalp where r and $n_i$ are prescribed by equation (1c). This yields explicit formulae for the functions $r^{SH}(s,q)$ and $n_i^{SH}(s,q)$ which, over each element, have the form derived above. The integration constants are determined by continuity at the element boundaries.

Ultimately, this leads to a symbolic expression for the functions $r^{SH}(s,q)$ and $n_i(s,q)$ that define the Super-Helix.

To keep the algebra simple, it can be useful to carry out the calculations associated with every element $S_Q$ in a particular frame, called the adapted frame for element Q. This orthonormal frame $(v_0^Q, v_1^Q, v_2^Q)$ is such that $v_0^Q$ is aligned with the constant Darboux vector $\Omega$ of the element $S_Q$, and that $v_2^Q$ is aligned with $\Omega \times n_0(s_Q^L)$ at the origin $s_Q^L$ of the element (this assumes that both the vectors $\Omega$ and $\Omega \times n_0(s_Q^L)$ are nonzero). The transformation from the adapted frame to the material frame at the origin of the element, $s = s_Q^L$, is given by $$n_0(s_Q^L) = \cos\beta v_0^Q + \sin\beta v_1^Q,$$

$$n_1(s_Q^L) = \frac{\kappa_1}{|\Omega|}\left(v_0^Q - \frac{\tau}{\kappa}v_1^Q\right) + \frac{\kappa_2}{\kappa}v_2^Q,$$

$$n_2(s_Q^L) = \frac{\kappa_2}{|\Omega|}\left(v_0^Q - \frac{\tau}{\kappa}v_1^Q\right) - \frac{\kappa_1}{\kappa}v_2^Q$$

Dynamic Equations for the Model

Given a deformable body whose configuration depends on generalized coordinates q(t), Lagrangian mechanics provides a systematic method for deriving its equations of motion, $\ddot{q}=a(q,\dot{q},t)$. This is done by feeding the Lagrangian equations of motion:

$$\frac{d}{dt}\left(\frac{\partial T}{\partial \dot{q}_{iQ}}\right) - \frac{\partial T}{\partial q_{iQ}} + \frac{\partial U}{\partial q_{iQ}} + \frac{\partial D}{\partial \dot{q}_{iQ}} = \int_0^L J_{iQ}(s,q,t) \cdot F(s,t) ds \qquad (4)$$

with the expressions for the kinetic energy $T(q, \dot{q}, t)$, for the internal energy $U(q,t)$ and for the dissipation potential $D(q,\dot{q},t)$ that describe the physics of the system at hand. The right-hand side of equation (4) is the generalized force $f_{iQ}$ deriving from the linear density $F(s,t)$ of physical force applied to the rod, and $J_{iQ}$ defines the Jacobian matrix, $J_{iQ}=\partial r^{SH}(s,q)/\partial q_{iQ}$. For example, three force contributions may be considered, namely hair weight, viscous drag from ambient air (considered at rest for simplicity) with coefficient $\upsilon$, and interaction forces with surrounding strands and body:

$$F(s,t)=\rho Sg - \upsilon \dot{r}^{SH}(s,q) + F^i(s,t), \qquad (5a)$$

where $F(s,t)$ is the total external force applied to the rod per unit length, $\rho S$ is the mass of the rod per unit length, and g is the acceleration of gravity.

Other forces, for example a force exerted by a comb, may also be considered.

The three energies in the equations of motion (4) that are relevant for an elastic rod are:

$$T(q,\dot{q},t) = \frac{1}{2}\int_0^L \rho S(\dot{r}^{SH}(s,q))^2 ds \qquad (5b)$$

$$U(q,t) = \frac{1}{2}\int_0^L \sum_{i=0}^2 (EI)_i (\kappa_i^{SH}(s,q) - \kappa_i^n(s))^2 ds \qquad (5c)$$

$$D(q,\dot{q},t) = \frac{1}{2}\int_0^L \gamma \sum_{i=0}^2 (\dot{\kappa}_i^{SH}(s,q))^2 ds \qquad (5d)$$

The kinetic energy T is defined as a function of the rod velocity, $\dot{r}=dr/dt$ in the conventional way. The internal energy U in equation (5c) is the elastic energy of the rod. The coefficients $(EI)_i$ are the principal bending stiffnesses of the rod in the directions $n_i$ (for i=1, 2) while $(EI)_0$ is the twisting stiffness, written $\mu J$ (for i=0).

The quantities $\kappa_i^n(s)$ are the natural curvatures (i=1, 2) and twist (i=0) of the rod. They characterize the shape of the rod in the absence of external force: for $\kappa_i(s)=\kappa_i^n(s)$ the elastic energy is vanishing and therefore minimum.

Zero natural curvatures ($\kappa_\alpha^n=0$ for $\alpha=1, 2$) model straight hair. Nonzero values will result in wavy, curly, or fuzzy hair.

Overall, the mechanical properties of the rod may be captured by six entities only, the stiffnesses $(EI_i)_{i=0,1,2}$ and the natural twist and bends $(\kappa_i^n(s))_{i=0,1,2}$. In an exemplary embodiment, the dependence of the stiffnesses on $\underline{s}$ may be neglected, but not that of the natural twist and the bends: small variations of $(\kappa_i^n(s))_\perp$ with $\underline{s}$ allow for more realistic hair styles.

For the dissipation energy D in equation (5d) a simple heuristic model for capturing visco-elastic effects in hair strands may be chosen, the coefficient γ being the internal friction coefficient.

All the terms needed in equation (4) are given in equation (5). By plugging the latter into the former, explicit equations of motion are obtained for the generalized coordinate q(t).

This leads to the equation of motion of a Super-Helix:

$$M[s,q] \cdot \ddot{q} + \gamma \dot{q} + K(q-q^n) = A[t,q,\dot{q}] \qquad (6)$$

In this equation, the bracket notation is used to emphasize that all functions are given by explicit formula in terms of their arguments.

In equation (6), the inertia matrix M is a dense square matrix of size 3N, which depends nonlinearly on q. The stiffness matrix K has the same size, is diagonal, and is filled with the bending and torsional stiffnesses of the rod. The vector $q^n$ defines the rest position in generalized coordinates, and is filled with the natural twist or curvature $\kappa_i^n$ of the rod over element labelled Q. The vector A collects all remaining terms, including air drag, interaction forces and other applied forces, which are independent of $\ddot{q}$ and may depend nonlinearly on q and $\dot{q}$.

Practical Calculation of the Equation of Motion of a Super-Helix

To compute the matrices M(s,q), K, and the vectors A(t,q,$\dot{q}$), one has to start from the symbolic expression for the functions $r^{SH}(s,t)$ and $n_i^{SH}(s,t)$. The linear velocity and acceleration are defined as $\dot{r}^{SH}(s,t)$ and $\ddot{r}^{SH}(s,t)$. The rotational velocity is the vector $\phi(s,t)$ such that $\dot{n}_i(s,t)=\phi(s,t)\times n_i(s,t)$. The rotational acceleration is defined as $\dot{\phi}$. On top of their dependence on the arc length s, the linear and rotational velocities are functions of q and $\dot{q}$, which depend linearly on $\dot{q}$. The linear and rotational accelerations are functions of q, $\dot{q}$ and $\ddot{q}$, which depend linearly on $\ddot{q}$.

By time derivation of the symbolic expressions for the functions $r^{SH}(s,t)$ and $n_i^{SH}(s)$, one can derive a symbolic expression for the linear and rotational velocities and accelerations, as functions of s, q, $\dot{q}$ (for all functions), and $\ddot{q}$ (for accelerations only). These calculations are most easily done using the adapted frame $(v_0^Q, v_1^Q, v_2^Q)$ defined earlier for every rod element $S_Q$. For instance, the linear velocity of the current point s belonging to a particular rod element labelled Q is first computed in this frame of reference, as a function of s and of the curvatures and twist of the element, $q_{i,Q}$ with i=0, 1, 2 and their derivatives, $\dot{q}_{i,Q}$; the relative motion of the adapted frame with respect to a fixed frame in Euclidean space being given by the linear and rotational velocities of the origin of the segment $s=s_Q^L$, classical formulae for the composition of linear and translational velocities yield the linear and, translational velocities of the current point $s\in S_Q$ belonging to this rod element, as functions of s, $q_{i,Q}$, $\dot{q}_{i,Q}$ (with i=0, 1, 2), $r^{SH}(s_Q^L)$, $\dot{r}^{SH}(s_Q^L)$ and $\phi(s_Q^L)$. Taking now in these formulae s to be the endpoint $s=s_Q^R=s_{Q+1}^L$ at the edge of the next element, one derives induction formulae for $\dot{r}^{SH}(s_{Q+1}^L)$ and $\phi(s_{Q+1}^L)$ as functions of $\dot{r}^{SH}(s_Q^L)$, $\phi(s_Q^L)$, $q_{i,Q}$ and $\dot{q}_{i,Q}$ (with i=0, 1, 2). Recall that the linear and rotational velocities of the origin s=0 of the rod are imposed by head motion, and so are known.

A similar reasoning yields the symbolic expression for the linear and rotational accelerations $\ddot{r}^{SH}(s,t)$ and $\dot{\phi}(s,t)$ of a current point $s\in S_Q$ belonging to element labelled Q, as a function of the linear and translational velocities and accelerations of the origin s of this element, and of the local degrees of freedom $q_{i,Q}$ and their derivatives $\dot{q}_{i,Q}$ and $\ddot{q}_{i,Q}$ for i=(0, 1, 2. A similar it also yields the induction relations for $\ddot{r}^{SH}(s_{Q+1}{}^L,t)$ and $\ddot{\phi}(s_{Q+1}{}^L,t)$ as a function of $\ddot{r}^{SH}(s_Q{}^L,t)$ and $\phi(s_Q{}^L,t)$, $\dot{r}^{SH}(s_Q{}^L,t)$ and $\dot{\phi}(s_Q{}^L,t)$, $\dot{q}_{i,Q}$, $\dot{q}_{i,Q}$ and $\ddot{q}_{i,Q}$. All these quantities can then be determined by induction over Q, using the motion of the scalp at $S_0{}^L=0$ to start the induction—note that all the resulting quantities will therefore depend on the motion of the scalp, although this is not written explicitly.

Many quantities derived below, such as the internal force T(s) are defined likewise by induction, by a similar reasoning.

In these derivations, one can take advantage of the fact that the linear and rotational velocities depend linearly on $\dot{q}$, and that the linear and rotational accelerations depend linearly on $\ddot{q}$. For instance, the acceleration can be written as $$\ddot{r}^{SH}(s, t) = \ddot{r}^*(q(t), \dot{q}(t), s) + \sum_{i=0,1,2; 1 \leq Q \leq N} \ddot{\kappa}_{iQ} \frac{\partial r(s)}{\partial \ddot{\kappa}_{iQ}},$$

where $\partial r(s)/\partial \ddot{\kappa}_{iQ}$ are functions of q and $\dot{q}$ that can be found explicitly identification with the expression for $\ddot{r}^{SH}(s,i)$ derived above.

One can also take advantage of the fact that each one of the functions introduced above, such as $\ddot{r}^{SH}(s,t)$, $\dot{r}^{SH}(s,t)$, $r^{SH}(s,t)$, $\phi(s,t)$, etc. can be expressed, on every segment $S_Q$, as linear combinations of a fixed set of functions of s or, better, of $(s-s_Q{}^L)$, with vector coefficients. These fixed set of functions of s can be determined; there remains to implement the rules for calculating these vector coefficients, which can be derived from the procedure above and involve induction formulae over Q.

It is advised to carry out these symbolic calculations and to implement the induction relations with the help of a symbolic calculation software.

At this point, it is possible to plug the symbolic expressions derived above into the Lagrangian equations of motion (4) and the energies and potentials (5), to derive an explicit, symbolic expression for all the terms in equation (6). To do this, it is convenient to proceed in two steps, detailed below. The first step is to compute the perturbation $\delta\theta^{[iQ]}$ to the orientation of the material frame, due to an arbitrary perturbation to the piecewise constant twist or curvatures. The second step is to compute the internal force T(s).

Consider all possible perturbations to the constant twist $\tau=\kappa_0$ curvatures $\kappa_1$ or $\kappa_2$ over a particular rod element labelled Q. Such a perturbation is indexed by a couple [iQ], where i=0 (when one considers a perturbation to the twist), or i=1, 2 (when either curvature is perturbed). Consider the infinitesimal change of orientation $\delta\kappa^{[iQ]}(s)$ of the material frame, associated with this perturbation. This quantity is defined by the fact that the infinitesimal change of the material vectors $u_j(s)$ when the twist or curvature are perturbed satisfies $\delta n_j(s) = \delta\theta^{[iQ]}(s) \times n_j(s)$ for all j=0, 1, 2 and for all s. This quantity can be determined by integrating symbolically the differential equation:

$$\frac{d(\delta\theta^{[iQ]}(s))}{ds} = \chi_Q(s')n_i(s)$$

with the initial condition $\delta\theta^{[iQ]}(0)=0$ at the origin of the rod. In this expression, $\chi_Q$ is the characteristic function over element. S introduced earlier.

The internal force T(s) is defined, like in the smooth setting, as the solution of the following differential equation:

$$T'(s) = -p(s) + \rho S \ddot{r}^{SH}(s),$$

where p(s,t) is the lineic density of applied external force. The internal force is determined using the applied force $T(L)=T_L$ as a boundary condition. This applied force depends on the boundary conditions; for a stressfree tip, as happens usually for hair. $T_L=0$. If a force is applied at this endpoint, the relevant value of $T_L$ should be used; if the displacement is imposed at the endpoint s=L, the force $T_L$ applied by the operator is an additional unknown of the problem—to determine it, one can use the fact that $\ddot{q}$ is ultimately a linear function of this $T_L$. It is convenient to split the internal force into several contributions, using the linearity of T(s) with respect to forces and accelerations:

$$T(s) = T^*(s) + T_p(s) + \sum_{i=0,1,2; 1 \leq Q \leq N} R_{iQ} \frac{\partial T(s)}{\partial R_{iQ}},$$

where a symbolic expression for $T^\infty(s)$ is found by solving for T(s) with the applied forces p and $T_L$, and accelerations of the degrees of freedom $\ddot{\kappa}_{iQ}$ set to zero; similarly, $T_p(s)$ is found by solving for T(s), considering the contributions coming from the applied forces only; finally, the functions $\partial T(s)/\partial \ddot{\kappa}_{iQ}$ are determined by considering the contribution to T(s) coming from a particular twist or curvature acceleration $\ddot{\kappa}_{iQ}$ only.

Once the functions $\delta\theta^{[iQ]}(s)$, $T^\infty(s)$ and $\partial T(s)/\partial \ddot{\kappa}_{iQ}$ have been determined symbolically, the equation of motion is given by equation (6) with:

$$\mathbb{M}_{[iQ],[i'Q']} = \int_0^L \left(n_0 \times \frac{\delta T}{\delta R_{iQ}}\right) \cdot \delta\theta^{[i'Q']} ds$$

$$\mathbb{K}_{[iQ],[i'Q']} = \delta_{[iQ],[i'Q']} (EI)_{[iQ]}$$

$$A_{[iQ]} = F_{[iQ]} - I_{[iQ]}$$

$$F_{[iQ]} = -\int_0^L (n_0 \wedge (-T_p)) \cdot \delta\theta^{[iQ]} ds$$

$$I_{[iQ]} = -\int_0^L (n_0 \times T^*) \cdot \delta\theta^{[iQ]} ds.$$

In these expressions, [iQ] is the index at which the degree of freedom $\kappa_{iQ}$ for the twist (i=0) or curvature (i=1, 2) is stored in the generalized coordinates q. $\mathbb{M}_{[iQ],[i'Q']}$ is the entry in the matrix $\mathbb{M}$ at row [iQ] and column [i'Q']. The function $\delta_{[iQ],[i'Q']}$ is Kronecker's symbol, which is 1 when both i=i' and Q=Q', and 0 otherwise. The coefficient. $EI_{[iQ]}$ is the average of the twist stiffness μJ (when i=0) or bending stiffness (when i=1, 2) for element Q. All the above integrals can be carried out off-line, since all the functions have been computed symbolically.

Whenever the anti-derivative of a trigonometric function is needed, as when integrating equations (1-3) to determine the centerline, or when determining the internal force T(s), or when computing the integrals above, it is recommended to introduce functions that are $C^\infty$-smooth. For instance, the following choice of integration constant avoids the introduction of non smooth functions in the anti-derivative of the sine function:

$$\int \sin(|\Omega|u) du = \frac{1}{|\Omega|}(1 - \cos(|\Omega|u)) = uV(|\Omega|u)$$

where V is the $C^\infty$-smooth function defined by $$V(y) = \frac{1-\cos y}{y},$$

extended by continuity with $V(0)=0$ at $y=0$. This trick can be applied to the successive anti-derivatives of $\sin(|\Omega|s)$ and $\cos(|\Omega|s)$.

The equation of motion (6) is discrete in space but continuous in time. For its time integration, one can use a classical Newton semi-implicit scheme with fixed time step. The terms $\ddot{q}$, $\dot{q}$ and $q$ in the left-hand side should be evaluated implicitly to improve stability.

Improving the Stability for Small Time Steps

At every time step, the update rule for $q$ and $\dot{q}$ by the partially implicit scheme outlined previously involves the solution of a linear system whose coefficients are given by the square matrix ($\mathbb{M}+\epsilon\gamma\mathbb{I}+\epsilon^2\mathbb{K}$), where $\epsilon$ is the time step and $\mathbb{I}$ the identity matrix, of size 3N. For $\epsilon\neq 0$, this matrix is non-singular. However, the mass matrix $\mathbb{M}$ constructed previously has determinant zero and, for very small time steps, this linear system becomes ill-conditioned. This is not a problem if the time step is kept large, which is possible for very smooth motions. If, however, the time step $\epsilon$ needs be set to small values, to handle sudden head motions for instance, the previous scheme can become unstable.

We found that the matrix $\mathbb{M}$ is typically of rank 2N, although it is a square matrix of size 3N×3N. This degeneracy can be easily understood from the smooth setting. Indeed, when the rotational inertia of the cross sections is neglected, as in equation (5b), the Kirchhoff equation for the balance of moments reads $M'+n_0\times T=0$, where M is the internal moment and T the internal force. When projected along the local tangent direction $n_0$, this equation yields: $M'\cdot n_0=0$, hence $(M\cdot n_0)'-(\Omega\times n_0)\cdot M=0$. This can be rewritten as:

$$\frac{d(\mu J(\tau(s)-\tau^n(s)))}{ds} = EI_1(n_1(s)-\kappa_1^n(s))n_2(s) - EI_2(n_2(s)-\kappa_2^n(s))\kappa_1$$

This equation comes together with the boundary condition $\mu J(\tau(L)-\tau^n(L))=M_{0,L}$, where $M_{0,L}$ is the twist moment applied at the endpoint $s=L$, which is $M_{0,L}=0$ if this endpoint is stressfree, as happens usually for hair. From this equation, it appears that, at any time, the function $\tau(s)$ can be determined directly from the functions $\kappa_1(s)$ and $\kappa_2(s)$ and from the value of $M_{0,L}$. This remark accounts for the degeneracy of $\mathbb{M}$: when the rotational inertia of the cross sections is neglected, the twist cannot be considered as an independent variable; instead, its value directly depends on the values of the material curvatures (note that the twist can only be determined from the material curvatures globally, by integration of the above differential equation).

We give two methods that can be used to improve dramatically the stability of the scheme for small $\epsilon$. Either method is possible. The first method is to no longer neglect the rotational inertia of the cross sections. The second method is to modify the algorithm and to keep the material curves only as independent variables, while the twist becomes a dependent variable.

In order to restore the rotational inertia of the cross sections, one has to include an additional term in the kinetic energy, and modify equation (5b) as follows:

$$T(q,\dot{q},t) = \frac{1}{2}\int_0^L \left(\rho S\left(\frac{dr^{SH}(s,q(t))}{dt}\right)^2 + \sum_{i=0}^2 I_i\omega_i^2\right)ds,$$

where $I_i$ are the diagonal components of the inertia tensor of the cross-section in the local material basis ($n_0$, $n_1$, $n_2$) (this tensor is assumed to be diagonal in this basis) and $\omega_i$ are the angular velocities of the cross section in this basis. This new term modifies the expression given previously for the matrix $\mathbb{M}$ and for the vector A in the equation of motion of the Super-Helix. The modified expressions can be found by a reasoning similar to the one given previously.

Another possibility to improve the stability of the algorithm is to make the twist a dependent variable. This can be done in several ways. One can for instance make the twist of each helical element a function of the curvatures of all the other elements. Let $\kappa_{j,Q}$ be the first (j=1) or second (j=2) material curvature associated with element Q, for $1\leq Q\leq N$. The twist $\tau_Q$ of the element i of the Super-Helix can be a priori constrained to be given by:

$$\tau_Q = \Phi_Q(\kappa_{1,1},\ldots,\kappa_{1,N},\kappa_{2,1},\ldots,\kappa_{2,N})$$

where $\Phi_Q$ are N prescribed functions.

We suggest two possible sets of choices of the functions $\Phi_Q$. Many other sets of choices are possible. The first one reads, for $Q=1,\ldots,N$:

$$\Phi_Q(\kappa_{1,1},\ldots,\kappa_{1,N},\kappa_{2,1},\ldots,\kappa_{2,N}) = \tau_Q^n,$$

where $\tau_Q^n$ is the natural twist for element Q. This choice is very easy to implement. However, it amounts to set the twist, stiffness of the Super-Helix to infinity and does not always lead to realistic results. Another suggested set of functions is:

$$\Phi_Q = \tau_Q^n + \frac{1}{\mu J_Q}\left(-\frac{l_Q}{2}\left[M_1^Q\kappa_{2,Q} - M_2^Q\kappa_{1,Q}\right] - \sum_{Q'>Q} l_{Q'}\left[M_1^{Q'}\kappa_{3,Q'} - M_2^{Q'}\kappa_{1,Q'}\right]\right),$$

where $\mu J_Q$ is the twist stiffness of element Q, $l_Q$ is the length of element Q, $M_k^Q$ is the internal moment defined by $M_k^Q = EI_k^Q(\kappa_{k,Q}-\kappa_{k,Q}^n)$, $EI_k^Q$ is the bending stiffness associated with k-th curvature and $\kappa_{k,Q}^n$ is the natural value for k-th curvature over element, Q. This formula is a discrete version of the solution of the differential equation for $\mu J(\tau-\tau^n)$ derived previously in the smooth setting.

When the twists are prescribed functions of the curvatures, the generalized coordinates are a vector $q_{2N}(t)$ of length 2N containing the material curvatures over each element, $q_{2N}(t)=\{\kappa_{1,1},\ldots,\kappa_{1,N},\kappa_{2,1},\ldots,\kappa_{2,N}\}$. The equations of motion for the generalized coordinates $q_{2N}(t)$ are derived, in a manner similar to that explained previously. In particular, the same expressions for the kinetic and elastic energies are used, as well as for the dissipation potential. The final result is that, if the increment $\Delta y = \dot{q}(t+\epsilon)-\dot{q}(t)$ of the time derivatives of the generalized coordinates was given at a particular timestep by the solution of a linear system of size 3N×3N:

$$\mathbb{A}\cdot\Delta y = \epsilon B$$

in the initial formulation, then, for the new, reduced kinematics having 2N independent degrees of freedom, the increments are determined at every time step by solving a linear system of size 2N×2N, namely $$(\mathbb{L}\cdot\mathbb{A}\cdot\mathbb{R})\cdot\Delta y_{2N} = (\epsilon\mathbb{L}\cdot(B-B_0)).$$

Here, $\Delta y_{2N}$ is the unknown increment for the time derivatives of the generalized coordinates of the problem with reduced kinematics, $\Delta y_{2N} = \dot{q}_{2N}(t+\epsilon) - \dot{q}_{2N}(t)$. The matrix $\mathbb{L}$ has dimensions 2N×3N. The matrix $\mathbb{R}$ has dimensions 3N/2N. The vector $B_0$ is of size 3N. The matrices $\mathbb{L}$ and $\mathbb{M}$ and the vector $B_Q$ reflect the choice of the functions $\Phi_i$, and depend on the values of these functions and on their gradients with respect to $q_{2N}$, at the current point $q_{2N}(t)$. The matrix $\mathbb{A}$ and the vector B are those computed with the original version of the algorithm. In the end, the linear system to be inverted, with matrix ($\mathbb{L} \cdot \mathbb{A} \cdot \mathbb{R}$), is no longer ill-conditioned.

Here, $\Delta y_{2N}$ is the unknown increment for the time derivatives of the generalized coordinates of the problem with reduced kinematics, $\Delta y_{2N} = \dot{q}_{2N}(t+\epsilon) - \dot{q}_{2N}(t)$. The matrix $\mathbb{L}$ has dimensions 2N×3N. The matrix $\mathbb{R}$ has dimensions 3N×2N. The vector $B_0$ is of size 3N. The matrices $\mathbb{L}$ and R and the vector $B_0$ reflect the choice of the functions $\Phi_i$, and depend on the values of these functions and on their gradients with respect to $q_{2N}$, at the current point $q_{2N}(t)$. The matrix $\mathbb{A}$ and the vector B are those computed with the original version of the algorithm. In the end, the linear system to be inverted, with matrix ($\mathbb{L} \cdot \mathbb{A} \cdot \mathbb{R}$), is no longer ill-conditioned.

Variant of the Super-Helix Model

The method for animating a Super-Helix derived earlier starts from a particular functional form for the material twist and curvatures as a function of the arclength s, namely from piecewise constant functions of s, see equation (3). With this particular functional form, the integration of the kinematical equations (1) and (2) can be made symbolically. Animation of this model by Lagrangian mechanics is then possible, using the energies and potentials given in equation (5).

One straightforward extension of this method is to add contributions in the form of Dirac's delta functions $\delta$ at the edges between neighbouring elements, that is to replace equation (3) with $$R_i(s,t) = \sum_{Q=1}^{N} q_{i,Q}(t)\chi_Q(s) + \sum_{Q=1}^{N} q_{i,Q}^\delta(t)\delta\left(s - s\frac{L}{Q}\right),$$

where the generalized coordinates q now collects both the piecewise constant values of twist and material curvatures, $q_{i,Q}$, and the Dirac contributions $q_{i,Q}^\delta$. The derivation of the dynamical equations for this model are very similar to the original one—in fact, this amounts to formally let the length of every other element go to zero in the previous formulation, while increasing in inverse proportion the strength of the twist and curvatures over these infinitesimal elements.

A specific instance of this variant is worth mentioning: one can kinematically constrain the material curvatures to be zero along the rod elements ($q_{i,Q}(t)=0$ for all t and Q, and for i=1, 2), and the material twist to have no Dime contributions ($q_{i,Q}^\delta(t)=$ for all t and Q, and for i=0). The equations of motion for our model can still be derived by the same method. This represents physically a set of inextensible but twistable straight segments, connected with flexural joints. This provides 21 natural model for an articulated chain displaying both flexural and torsional stiffnesses. This model is reminiscent of the popular field of 'Articulated body dynamics', with the important difference that the 'links' are not rigid here as they can twist.

Other variants of the model are possible, which are obtained by imposing in equation (3) a different functional dependence on s. Instead of using piecewise constant functions, it is possible to use, for instance, piecewise linear functions. However, the drawback is that the integration of the kinematical equations becomes more involved and/or cannot be made symbolically, making the derivation of the equations of motion more difficult.

Envelope Surface

An algorithm may be used for processing collisions between hairs and between the hairs and a body or an object, for example.

Detection may be performed effectively by taking advantage of the time coherence of the movement of hairs, by acting on each time step to retain and update pairs of points that are the closest together. Contacts between volumes of hair can be processed by dissipative penalty forces.

In exemplary implementations of the invention, at least one envelope surface is calculated for each lock, the lock being associated, for example, with a set comprising a plurality of director hairs.

At least one envelope surface may be calculated for each director hair. In a variant, an envelope surface is calculated for each rod element, as shown in FIG. 12.

The term "envelope surface" is used to mean a surface encompassing the element(s) on which the rod mechanical model is applied. The parameters defining an envelope surface are explained in greater detail below with the help of an example of envelope cylinder.

The envelope surface may be calculated differently at least depending on the values of the bending and twisting of the director hair or of the rod element, and depending on the length of the director hair or the rod element.

A set of envelope cylinders may be generated around a rod element or a director hair or a lock.

Each rod element may be surrounded, for example, by a varying number of envelope cylinders, e.g. a number lying in the range 1 to 3.

An envelope cylinder can be generated around a rod element or a director hair of helical shape.

A rod element, a director hair, or a lock can be modeled, for example, with the help of a varying number of envelope cylinders, e.g. a number lying in the range 1 to 3.

Collisions may be detected between the envelope surfaces.

Collisions may be detected between at least one envelope surface and at least one outside surface representative of a body or of an object.

The outside surface representative of a body or of an object can be modeled, for example, by at least one envelope sphere or at least one envelope plane.

In an implementation of the invention, the distance between at least two main axes of two different envelope surfaces are tracked in time.

The observed distance may correspond for example to the distance between the main axis of an envelope cylinder and the main axis of another envelope cylinder, or else the distance between the center of an envelope sphere and the main axis of an envelope cylinder, or indeed the distance between the main axis of an envelope cylinder and a point belonging to an envelope plane.

The distance between a plurality of pairs of points belonging respectively to the main axes of two envelope surfaces may be tracked, with each pair of points defining a tracking segment.

A tracking segment may correspond, for example, to a segment interconnecting two points belonging to two different main axes of two different envelope cylinders, or indeed one of the points can belong to a main axis of an envelope cylinder while the other point is the center of an envelope sphere, or else one of the points may belong to a main axis of an envelope cylinder and the other may belong to an envelope plane.

Collisions may be detected between at least two envelope surfaces or between an envelope surface and an outside surface representative of a body or an object, as follows:

when the length of each of the tracking segments is greater than a determined value $dist_{max}$, there is no collision and the time tracking of the tracking segments of at least two envelope surfaces is interrupted, and under such circumstances, the distances between a plurality of pairs of points in the vicinity of the previously observed pairs of points are tracked; and when the length of each of the tracking segments is less than a determined value $dist_{min}$, elastic penalty forces proportional to the interpenetration between the colliding surfaces may be applied to the rod mechanical model.

In a variant, a so-called Lagrangian multiplier method may be applied when processing collisions.

The penalty forces may comprise an elastic normal component and a tangential component that models viscous friction.

The penalty forces applied during the collision between at least one envelope surface and at least one other envelope surface or outside surface may be a function of the direction of relative displacement projected onto the main axis of one of the envelope surfaces of the surfaces in collision. This may make it possible to take account of the orientation of scales on human hair and to improve the realism of the simulation.

In order to detect the collisions that might occur between at least two director hairs or between at least two locks of hair, for example, in a manner that is both effective and precise, implementations of the method of the invention may include:

using adaptive cylindrical encompassing envelopes around the locks, of number and size that adapt automatically over time to the extent to which the lock is wound helically; and at each time step, tracking pairs of points that are the closest together between the main axes of the encompassing cylinders.

Adaptive Cylindrical Encompassing Envelopes

The volume encompassing an element $Q_i$ of a director hair may be made up of a single cylinder encompassing the shape of the director hair, e.g. a helical shape of the director hair when the turns of the helix are sufficiently numerous and close together, or otherwise, a plurality of cylinders, e.g. one or two that are oriented along the local mean tangent of the element. This algorithm is described below.

The radius $r_h$ and the pitch $\Delta_h$ of a helix can be deduced from the bends and twisting $\kappa_1, \kappa_2, \tau$ of the corresponding rod, using the following formulae:

$$r_h = \frac{\kappa}{\Omega^2}$$

$$\Delta_h = 2\pi \cdot \left(\frac{\tau}{\Omega^2}\right)$$

where $\kappa = \sqrt{\kappa_1^2 + \kappa_2^2}$ and $\Omega = \sqrt{\kappa^2 + \tau^2}$. The number $n_{twist}$ of turns followed by the helical portion can then be calculated as follows:

$$n_{twist} = \frac{l_i}{(2 \cdot \pi \cdot r_h)},$$

where $l_i$ is the length of the element $Q_i$.

The number of turns described by the element $Q_i$, and the pitch $\Delta_h$ of the helix, representing the "tightness" of the turns, may be used as criteria for selecting an encompassing volume that is adapted to the element under consideration. These criteria may be reevaluated on each time step, and the encompassing volumes tend thus to adapt the current shape of the locks of hair.

Using the notation $C(a,r)$ for the cylinder of unity $$\frac{a}{\|a\|},$$

of length $\|a\|$, and of radius $r$, the encompassing volume $V_e$ of the element may then be calculated as follows:

$$\left\{\text{if } (n_{twist} \geq n_{twist}^{max}) \text{ and}(\Delta_h < \Delta_h^{max}) \; V_e = C\left(\frac{l_i \cdot \tau}{\Omega^2} \cdot \Omega, r_h + r_w\right)\right.$$

$$\left\{\text{if } (n_{twist} \geq n_{twist}^{min}),\right.$$

$$V_e = C\left(r \cdot \left(\frac{s_{i-1} + s_i}{2}\right) - r \cdot (s_{i-1}), r_w\right) + C \cdot \left(r \cdot \left(s_i - r \cdot \left(\frac{s_{i-1} + s_i}{2}\right)\right), r_w\right)$$

$$\{\text{else}, \; V_e = C(r(s_i) - r(s_{i-1}), r_w).$$

where $r_w$ is the radius of the lock guided by the super-helix, and $n_{twist}^{min}$, $n_{twist}^{max}$ and $\Delta_n^{max}$ are thresholds set by the user as a function of the accuracy desired for the encompassing volumes.

Below, the term "guide volume" is used to mean the encompassing volume defined from a director hair for the corresponding lock (set of encompassing cylinders).

Tracking the Closest-Together Pairs of Points

The closest-together pairs of points may be tracked between the main axes of the cylinders used as encompassing volumes for different locks, as defined above. This may be reduced to tracking pairs of closest-together segments.

A list of segment pairs may contain the segment pairs that are the closest together during the simulation. When starting, the list may be initialized with all of the pairs that might be formed by taking all of the segments adjacent to the roots of the hairs. The list may then be updated on each time step.

For each pair of segments ($seg_i$, $seg_j$):

it is possible to test the pairs of segments (e.g. nine segments) formed from segments adjacent to $seg_i$ and $seg_j$ (the neighborhood of two segments being taken as meaning said segments being adjacent along their common guide volume) and the new closest pair of segments is extracted, that is to replace the preceding pair. This method may make it possible to propagate a detection pair along interacting locks;

the pair is eliminated and not replaced if itself and all of the pairs formed in its vicinity are constituted by segments of distance greater than a certain threshold $dist_{max}$, beyond which it is assumed that tracking is no longer necessary; and if the distance between the segments $seg_i$ and $seg_j$ is less than a threshold $dist_{min}$ (determined by the sum of the radii of the corresponding encompassing cylinders), then a collision-response process is triggered. Further-more, the pairs constituted by segments adjacent to seg$_i$ and seg$_j$ are added to the list of pairs being tracked.

Given that the rod mechanical model of the invention has bending and twisting as its parameters, it may be relatively difficult to impose constraints on the model in terms of position or speed. Nevertheless, it is possible to interact with the model via forces, so the collision responses may be calculated using penalty forces.

The algorithm may be stabilized by using quadratic regularization for small penetrations. Starting from an arbitrarily-selected regularization depth $\delta_{reg}$, it is possible to calculate the normal reaction force $R_N$ exerted between the two closest-together points (detected as being in contact by the preceding algorithm) for example as follows:

$$\begin{aligned}&(\text{if } (gap \leq 0)) & R_N &= 0 \\ &(\text{if } (0 \leq gap \leq \delta_{reg})) & R_N &= \frac{k_c gap^2}{2\delta_{reg}} n_c \\ &(\text{else} & R_N &= k_c\left(gap - \frac{\delta_{reg}}{2}\right) n_c\end{aligned}$$

where $n_c$ is the unit vector giving the collision direction (calculated as the vector product of the two closest-together segments), and $k_c$ is ruled in arbitrary manner.

To model friction between contacting locks, the following viscous friction relationship may be used:

$$R_T = \upsilon(\upsilon_{rel} - (\upsilon_{rel} \cdot n_c) n_c)$$

When there is friction between a lock and an external object, the coefficient of friction $\upsilon$ can be modulated by a trigonometric function so as to take account of the anisotropy of the surface state of the hairs.

Parameters Applied to the Rod Mechanical Model

Examples of a rod mechanical model in accordance with the invention may incorporate at least one mechanical dissipation parameter for modeling the damping of the movement of the director hair.

The dissipation parameter may be associated for example with the elasticity of the hair, or with the natural curling of the hair, or indeed with viscous friction, for example relative to air.

The dissipation parameter may also be associated with contact against an outside surface representative of a body or an object.

The rod mechanical model may incorporate at least one physical parameter associated with a mechanical property of at least one hair of at least a portion of a head of hair selected from the following list: hair length (L); hair radius(ii); main radii ($r_x$, $r_y$) of the hair, in particular the ellipticity of the hair; spontaneous twisting and bending ($\sigma''$, $\kappa_1''$, $\kappa_2''$) of the hair about one or more axes; density ($\rho$); linear mass of the hair; clamping angle(s) ($\theta_0$) of the hair in the scalp; bending stiffness(es) ($EI_1$, $EI_2$) of the hair; Young's modulus (E); Poisson's ratio (nu); spontaneous twisting ($\tau''$) of the hair; twisting stiffness ($\mu J$); and porosity of the hair; and in particular, more specifically: density; linear density of the hair; clamping angle(s) of the hair in the scalp; Young's modulus; Poisson's ratio; spontaneous twisting of the hair; and porosity of the hair.

At least one of the physical parameters may vary as a function of the arc length measured along the hair.

To simulate the motion of a given sample of hair, which may either be a hair wisp or a full head of hair, the physical and geometric parameters of each Super-Helix may be deduced from the structural and physical properties of the hair strands composing the clump. Then, friction parameters of the model may be adjusted depending on the damping observed in real motion of the clump. Finally, interactions may be set up between the Super-Helices to account for contacts occurring between the different animated hair groups.

Hair Mass and Stiffness

The volumic density $\rho$ may be set to be equal to a typical value for hair, 1.3 grams per cubic centimeter (g·cm$^{-3}$). The mean radius $\underline{r}$ and the ellipticity $$e = \frac{r_{max}}{r_{min}}$$

of the Super-Helix cross-section may be deduced by direct microscopic observation of real hair fibers whereas Young's modulus and Poisson's ratio are taken from existing tables, which report values for various ethnic origins. These parameters are then used to compute the bending and twisting stiffnesses (EI)$_{i=0, 1, 2}$ of the Super-Helix using classical formulae for rods with elliptic cross-sections.

Natural Curliness

The natural bending and twist parameters of the Super-Helix model may be set by:

$$\kappa_1^n = 1/r_h$$
$$\kappa_2^n = 0$$
$$\tau^n = \frac{\Delta_h}{2 \cdot \pi \cdot r_h^2}$$

where $r_h$ is the radius and $\Delta_h$ the step of the approximate helical shape of the real hair clump, measured near the tips.

The actual bends and twist may be equal to their natural values at the free end of the rod, where the role of gravity becomes negligible.

Internal Friction $\gamma$

This parameter measures the amount of internal dissipation within a Super-Helix during motion. It especially accounts for the hair-hair dissipative interactions occurring inside the hair clump whose motion is guided by the Super-Helix. The internal friction may be easily adjusted by comparing the amplitude of deformation between the real and the simulated hair clump when vertical oscillatory motion is imposed. Good results may be obtained with $\gamma \in [5 \times 10^{-10}, 5 \times 10^{-11}]$ kilogram cubic meters per second (kg·m$^3$·s$^{-1}$).

Air-Hair Friction Coefficient

Once parameter $\gamma$ is chosen, the air-hair friction parameter may be matched by comparing the duration of damping between the real and the simulated hair clump, for example when imposing a pendulum motion. The air-hair friction coefficient $\nu$ may be chosen in the range $5 \times 10^{-6}$ kilograms per meter second (kg(ms)$^{-1}$) (disciplined hair) to $5 \times 10^{-5}$ kg(ms)$^{-1}$ (fuzzy hair), for example.

Friction with Another Object

Contacts between hairs, and between hair obtained by the model of the invention and external objects (such as the body) may be performed through penalty forces which may include a normal elastic response together with a tangential viscous friction force. For simulating realistic contacts between hair and external objects, an anisotropic friction force is used, to take account of the oriented scales covering individual hairs.

The friction parameter may be directly adjusted from real observations of sliding contacts between the hair clump and a given material, and then multiplied by a cosine function to take account of the orientation of hair fibers with respect to their sliding motion over the external object.

Interactive System

Independently of or in combination with the above, the invention provides an interactive system for dynamically simulating at least a portion of a head of hair in movement, the system comprising:

- a computer for calculating the shape of at least one director hair by applying to said hair at least one mechanical model of an inextensible rod having inertia, and twisting and bending stiffnesses; and
- a device for generating at least one synthesized image of the portion of a head of hair from the shape of the director hair as calculated in this way.

The computer may be located at a point of sale, for example, or in a hairdressing salon, or remotely located and consulted by means of a terminal and a computer and/or telephone network. The computer may comprise a personal microcomputer or a server, for example.

The system may further include a database including information linked to changes in at least one physical parameter of a hair of a portion of a head of hair as a function of a treatment applied to the hair.

The treatment may be selected from the following list: permanent waving, crimping, decrimping, dyeing, drying of a wet hair, application of a composition to the hair, in particular a coating composition, application of a gel, setting, cutting, conditioning, thickening, lengthening, external climatic events, in particular rain, wind, sun.

Two treatments may differ from each other at least in the quantity of composition applied, the thickness of the layer of composition applied, the duration of the treatment, the diameter of the crimping iron, the temperature of the crimping iron.

A treatment may vary as a function of the arc length measured along the hair.

The device for generating images may be configured to generate a virtual image or sequence of images of the hair after the application of a treatment.

The device for generating images may be configured to display simultaneously an image or a sequence of images of the hair before treatment and an image or a sequence of images of the hair after application of the treatment.

Atlas

Independently of or in combination with the above, the invention provides an atlas comprising:

- at least two images, for example a sequence of images, generated by the above method; and
- information associated with each image or sequence of images linked to at least physical parameter of the director hair.

For example, such an atlas may comprise a plurality of sequences of images corresponding to different degrees of one or more physical parameters of the hair. The images may be printed out or displayed on a screen or contained in an electronic form in a file.

The information may comprise one or more of the following: an alphanumeric character, a symbol, a drawing, a color, or a bar code.

Product

Independently of or in combination with the above, the invention provides a product comprising:

- a hair-care composition;
- an image or a sequence of images generated by the above method; and
- information associated with the image or sequence of images associated with a physical parameter of the director hair.

The image and the associated information may for example be useful for informing the customer or the hairdresser as to the type of hair for which the composition is suitable or the type of result that can be obtained.

Characterization Method

Independently of or in combination with the above, the invention provides a method of characterizing a hair, including the step of enabling a comparison between an image or sequence of images of the hair to be characterized and an image or sequence of images of a virtual hair obtained by the above method.

For example, the characterization may aim to quantify a physical parameter of the real hair that is the subject of the comparison.

Where appropriate, the characterization method may be implemented at different times, for example to highlight the effects of a treatment or an external event.

Where applicable, a physical parameter of the hair may be modified as a function of the comparison, in order to enhance the resemblance between at least one image or sequence of images of the hair to be characterized and at least one image or sequence of images of the virtual hair. For example, from one to four or even only one or two physical parameters may be modified.

A measurement of a physical parameter of the hair and a simulation parameter may be adjusted to achieve the required degree of matching between the images of the hair to be characterized and the virtual hair.

A simulation parameter may be modified until a predefined degree of matching of the shapes of the hair to be characterized and the virtual hair has been achieved.

The physical parameter measured may be selected from the following list: the length of the hair, the mean radius of the hair, the ellipticity of the hair, the linear density of the hair, the modulus of elasticity of the hair, its bending moment or moments, its twisting moment, its spontaneous bending, its spontaneous twisting.

The characterization method may be implemented after receiving an electronic image of the hair to be characterized, in particular a computer image. The hair to be characterized may be used itself instead of the image of the hair to be characterized.

Independently of or in combination with the above, the invention further provides a method of generating digital data defining the shape of a hair, comprising:

- receiving an image of a hair;
- from the shape of the hair in the received image and from a behavioral relationship, generating digital data comprising one or more values of one or more physical parameters linked to a mechanical property of the hair.

Prescription Method

Independently of or in combination with the above, the invention provides a method of prescribing a hair-care composition, comprising:

- determining a characteristic of a hair from a head of hair to be treated by comparing the real hair with at least one images or sequence of images of virtual hair obtained by the above method;

prescribing a hair-care composition as a function of the characteristic that has been determined.

The selected hair-care composition may be sent to the subject via a distribution center, for example.

Hair-Treatment Method

Independently of or in combination with the above, the invention provides a hair-treatment method, comprising:

associating with a customer, information linked to the shape of a hair of the customer by comparing the real hair to at least one image or sequence o images of virtual hair obtained by the above method;

as a function of that information, selecting a hair-care composition from a set of compositions, for example products identified by corresponding identifiers;

treating the customer using the selected product.

Method of Modeling the Impact of a Treatment

Independently of or in combination with the above, the invention provides a method of modeling the impact of a treatment or an external event applied to a hair, comprising:

displaying a synthesized image or sequence of images of a hair;

displaying a synthesized image or sequence of images of said hair, preferably obtained by the above method, after it has undergone the treatment or the selected external event.

Where appropriate the treatment or the external event may have been selected from a plurality of treatments or external events.

Such a method shows the appearance of the hair after the treatment has been effected, compares the appearance of the hair before and after the treatment, and shows the result of the treatment in advance, for example to enable the user to make an informed decision as to the treatment to be applied. This enables a specific treatment solution to be proposed to a user, for example, including showing them the result that will be obtained with such a treatment.

For example, the method may show the effect on the appearance of the hair of a treatment for coating it.

The synthesized image of the treated hair may be calculated by modifying a physical simulation parameter, the modification depending in particular on the selected treatment.

A sequence of images of the hair after treatment in motion; and a sequence of images of the hair in motion before treatment may be displayed simultaneously on the same screen.

The treatment to be applied may be one or more from the following list: permanent waving, crimping, combing, decrimping, dyeing, wetting, drying of a wet hair, application of a coating composition to the hair, application of a gel, setting, cutting, conditioning, thickening, lengthening, external climatic events, in particular rain, wind, sun, hair dressing, geometrical constraints due for example to clamping of hair with ties.

The treatment may vary as a function of the arc length measured along the hair.

The mechanical effects of coating the hair or of a loss or uptake of moisture by a hair may be simulated, for example.

Hairdresser Training Method

Independently of or in combination with the above, the invention provides a hairdresser training method, comprising:

selecting a treatment to be applied to a hair;

displaying a virtual image or sequence of images generated by the above method of a hair that has undergone the selected treatment.

Method of Promoting the Sale of a Hair-Care Composition

The invention further provides a method of promoting the sale of a hair-care composition, for example a permanent waving, straightening, and/or smoothing composition for the hair, taking into account information representing one or more physical parameters linked to the shape of the hair, for example two or more physical parameters linked to the shape of the hair.

That promotion may be effected via any communications channel. For example it may be effected by a retailer, directly at a point of sale, by radio, by television, or by telephone, for example in the context of commercials or short messages. It could equally be effected via the print press or any other form of document, for example for advertising purposes. It could be effected via any other appropriate data processing network, for example via the Internet or via a mobile telephone network. It could equally be effected directly on the product itself, in particular on its packaging or on any explanatory material associated with it.

Independently or in combination with the above, the invention also provides a method of generating a sequence of synthesized images of a hair in movement, the method comprising the following steps:

representing at least one hair or group of hairs by at least one helical rod comprising one or more helical portions; and animating said at least one helical rod by using the principles of Lagrangian mechanics.

The method may also include the steps consisting in generating at least one sequence of images of said at least one hair or group of hairs as represented and animated in this way.

Independently or in combination with the above, the invention also provides a system comprising:

computer means enabling at least one hair or group of hairs to be represented by at least one helical rod having one or more helical portions, and enabling said at least one helical rod to be animated using the principles of Lagrangian mechanics; and means for generating at least one sequence of images of said at least one hair or group of hairs as represented and animated in this way.

The system may also include means for displaying said at least one sequence of images, in particular by means of a screen.

The system may also be configured to generate at least a first sequence of images of hair prior to treatment and a second sequence of images of said hair after said treatment.

The display means are arranged in such a manner as to display said at least one first sequence and said at least second sequence simultaneously or successively.

Independently or in combination with the above, the invention also provides the use of images obtained by the method described above to provide a head of hair for an avatar or to promote the sale of cosmetics, or in a film, or in a video game.

Independently or in combination with the above, the invention also provides a computer program product including instructions readable by a computer system including at least a microprocessor, said instructions controlling the operation of the computer system so as to implement the above-described method.

BRIEF DESCRIPTION OF THE DRAWINGS

The invention can be better understood on reading the following detailed description of non-limiting embodiments thereof and examining the appended drawings, in which.

IMPLEMENTATIONS

Figure 1:
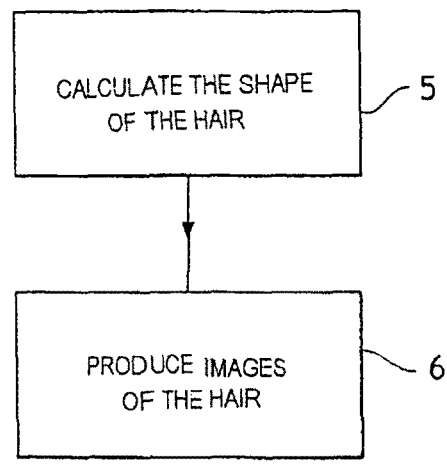
FIG. 1 is a block diagram corresponding to an example of a method of generating a synthesized image.

Each form of modeling just described may be used to generate a synthesized image of hair. The following steps may be executed for this purpose, as illustrated in FIG. 1:

- in a first step 5, calculating the shape of the hair by applying the above-mentioned model, thereby determining the shape of the hair as a function of one or more physical parameters linked to a mechanical property of the hair; and
- in a second step 6, producing an image or a sequence of images of the hair with shapes calculated in this way.

Figure 2:
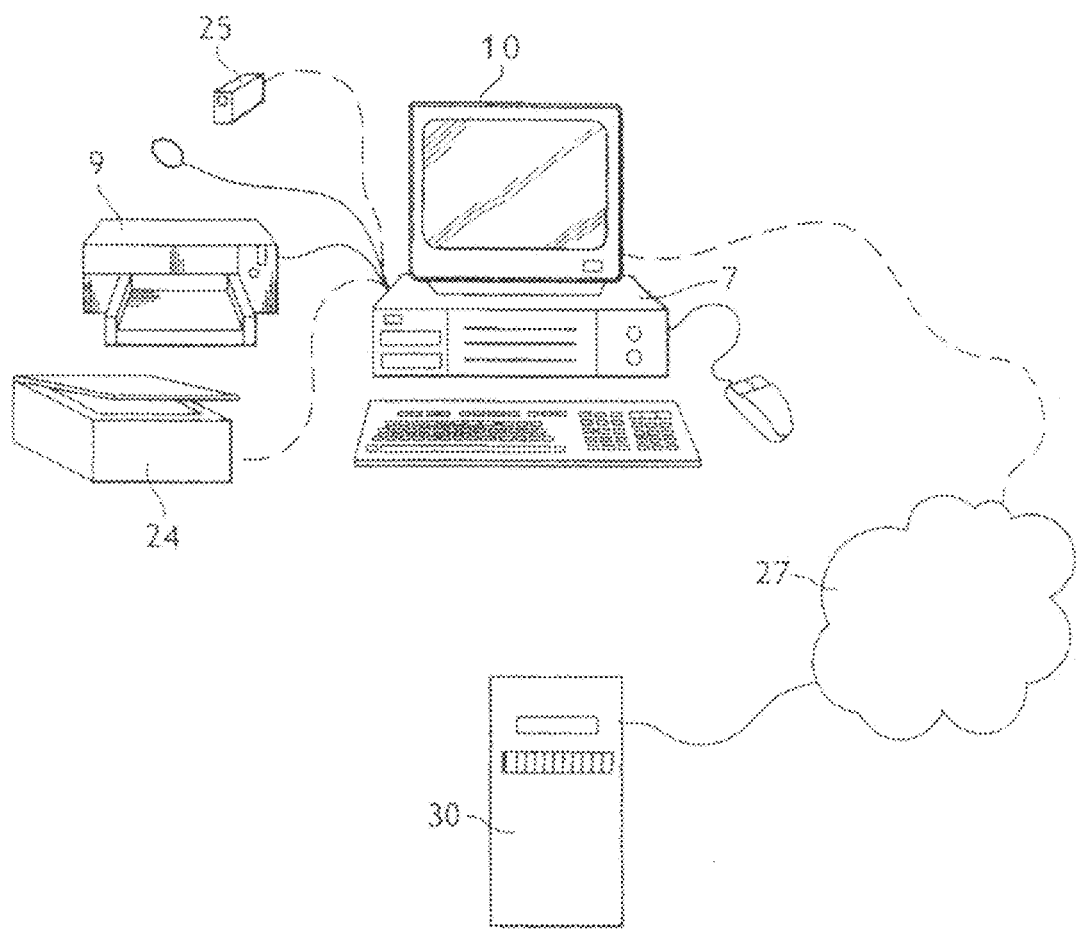
FIG. 2 represents diagrammatically an example of a system for generating a synthesized image of the hair.

This method may be implemented by means of an interactive system for representing a hair, including, as shown in FIG. 2:

- a computer 7, for example a personal computer, where appropriate connected by a computer network 27 to a remote server 30, for example an Internet site server, the computer 7 calculating the shape of a hair by applying one of the modeling methods described above;
- a screen 10 for displaying an image of a hair of shape that has been calculated in this way, for example a liquid crystal screen, a cathode ray tube screen, or plasma screen; and
- where appropriate a printer 9, which may replace the screen 10.

Results of the simulation may be displayed with the synthesized image or sequence of images of the hair in a first area of the screen and in a second area of the screen, elements for adjusting physical parameters that influence the mechanical behavior of the hair.

The system may further include means (not shown) providing a stereoscopic view of the virtual hair.

The adjustment elements may include a cursor movable between two or more positions corresponding to different values of the physical parameter concerned, for example.

Of course, using a different number of physical parameters does not depart from the scope of the present invention. For example, the physical parameters displayed and that where applicable may be modified may relate directly to the appearance of the hair, for example the length of the hair, or may be linked to mechanical characteristics of the hair, for example the radius or radii of the hair strand, the ellipticity of the hair strand, the spontaneous bend of the hair strand relative to one or more axes, the angle or angles of embedment of the hair strand in the scalp, the spontaneous twist of the hair strand; and/or to characteristics linked to one or more materials constituting the hair, for example its Young's modulus, its Poisson's ratio, its bending moments, its twist moment, the coefficient of elasticity of the hair, the porosity of the hair, the density or the linear density of the hair.

Where appropriate, a physical parameter may vary as a function of the arc length of the hair. For example, the twist may be greater at certain points along the hair. The variation of certain physical parameters as a function of the arc length may be linked to past treatments effected on the hair and to how it grows, which may vary in time, or how it ages, the hair becoming increasingly older in the direction away from its root. For example, the hair may have a distal portion that has been subjected to a bleaching treatment and a proximal portion that has grown since that treatment and has different mechanical characteristics. Where appropriate, the system may be configured to enable the user to define the manner in which a parameter varies along the hair as a function of the arc length. For example, one or more parameters may have a first value over a first portion of the length of the hair and a second value, which may be different from the first, over a second portion of its length.

Where appropriate, the system may include or access a database containing typical values of certain parameters, for example as a function of the ethnic hair type, its color and/or certain treatments effected.

Characterization of the Hair

Figure 3:
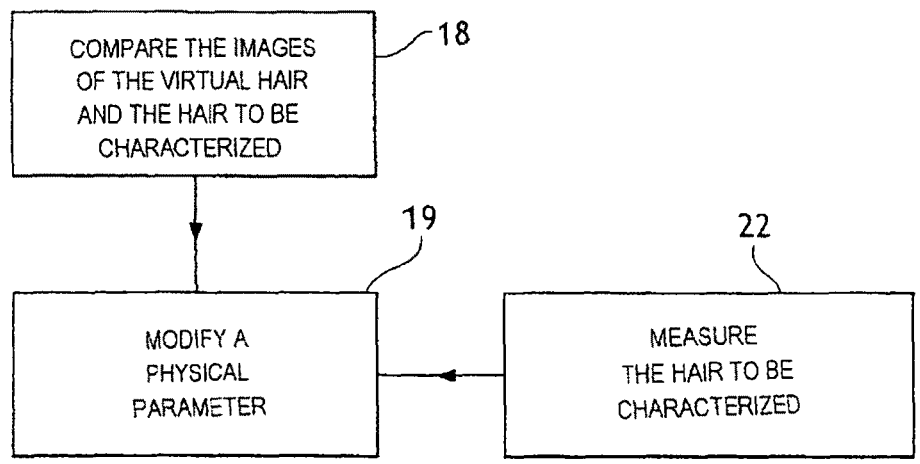
FIG. 3 is a block diagram corresponding to an example of a method of characterizing the hair.

The system and method described above may be used to characterize a hair, for example by implementing the steps of the method shown in FIG. 3.

In a first step 18, an image or sequence of the hair to be characterized is compared to an image or sequence of a virtual hair obtained by the simulation method described above.

Then, in the step 19, a physical parameter of the hair may be modified as a function of the result of the comparison, with a view to enhancing the resemblance between the image of the hair to be characterized and the image of the virtual hair.

The head of hair of a person may be characterized on the basis of the same hair or different hairs, for example three hairs, taken from the same head of hair. For example, one hair may be taken from the crown and one other hair from each side of the head. Where appropriate, the results of measurements effected on a greater number of hairs may be processed statistically, in order to average values measured or determined by simulation, for example. Alternatively, the variations of the parameters characterizing a hair may be measured for hairs situated at different places in the head of hair.

These characterization results may be listed in a database with information concerning the persons from whom the hairs were taken.

In this way characteristics of a hair may be recorded and thus known at different times in its life cycle, in particular one or more of the physical parameters used to simulate the appearance of the hair. Such information may be useful for prescribing a treatment or choosing a hair-care composition, for example.

The result of the characterization may be received in electronic form, for example via the computer network 27, and may delivered, in written or oral form, at a point of sale of products, in a beauty or hair salon, at the surgery of a dermatologist, or remotely, for example by connecting to an Internet site server.

The hair may be characterized manually, semi-automatically or automatically.

The image or real hair may be acquired by means of a two-dimensional acquisition system such as a scanner 24 or a video camera 25, for example, as shown in FIG. 2, or by means of a three-dimensional acquisition system, such as a stereovision system, for example.

The hair to be characterized may be used itself instead of the image of the hair to be characterized, for example by applying it to the screen using adhesive tape or any other appropriate fixing means.

Characterization may where appropriate be followed by giving advice. The advice may include the prescription of at least one hair-care composition having an action on a physical parameter of the hair, for example. This may be a composition for a form of hair treatment other than a dyeing treatment, for example permanent waving, crimping, straightening, and/or decrimping, or coating of the hair, for example.

Prescription

Figure 4:
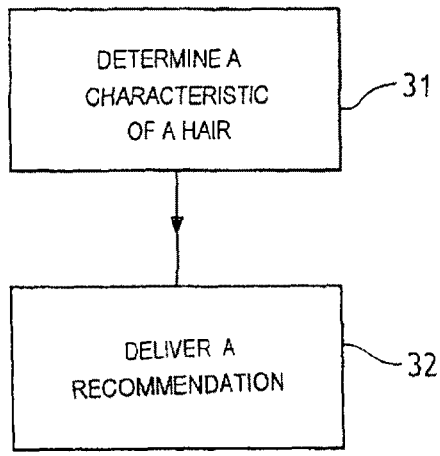
FIGS. 4 to 7 are block diagrams corresponding to other examples of methods according to the invention.

FIG. 4 shows a method of prescribing a hair-care composition, in which:
- in the step 31a characteristic of a hair of a head of hair to be treated is determined by comparing, for example using the method shown in FIG. 3, the real hair with a virtual hair obtained by the method shown in FIG. 1, for example;
- in the step 32 a recommendation is made that is linked to the prescription of a hair-care composition as a function of the characteristic determined in this way.

For example, this prescription method may be used at a point of sale, in a hairdressing or beauty salon, in a perfume outlet, in a department store, or remotely by means of the computer network 27.

Where appropriate, after the step 32, a product adapted to obtain a required result is handed or sent to the user or used in situ.

The product may be supplied through any sales channel, in particular through a shop or by mail order, or through a beauty parlor or a hairdressing salon, for example.

Treatment

Figure 5:
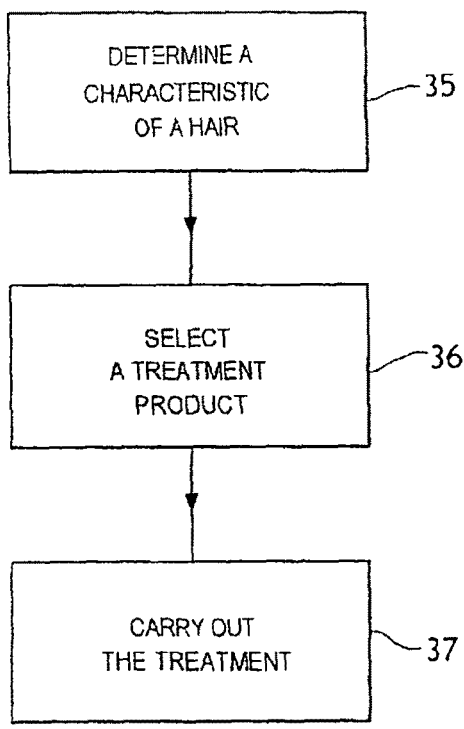

The method and the system described above may be used to apply a hair-treatment process, as shown in FIG. 5, which process includes the following steps:
- in the step 35, associating with a customer a characteristic representing a physical parameter linked to the shape of a hair by comparing, a real hair of the customer to a virtual hair obtained by the method of the invention, for example;
- in the step 36, as a function of that characteristic, selecting a hair-care composition from a set of compositions identified by corresponding characteristics;
- in the step 37, treating the customer with the selected composition.

The treatment may be selected from the following list: permanent waving, crimping, decrimping, dyeing, drying of a wet hair, application of a composition to the hair, in particular a coating composition, application of a gel, for example a polymer coating, setting, cutting, conditioning, thickening, lengthening.

Modeling the Impact of a Treatment or Exposure to a Predetermined Event

Figure 7:
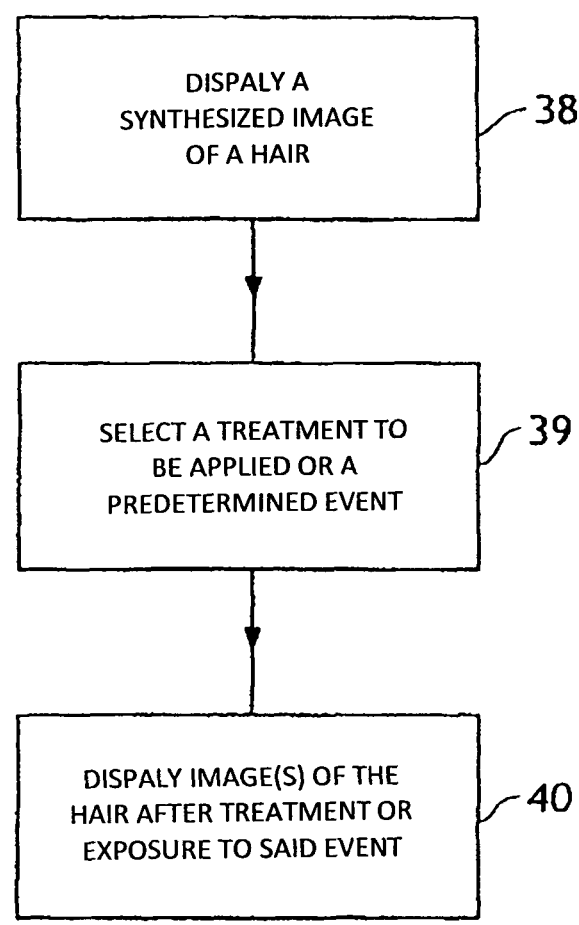

The method and system described above further enable the implementation of a method, shown in FIG. 7, of modeling the impact of a treatment applied to a hair or of exposure to a predetermined event, for example a climatic event, aging or photo aging, the method including:
- in the step 38, displaying a synthesized image of a hair;
- in the step 39, selecting a treatment to be applied or a predetermined event;
- in the step 40, displaying a synthesized image or sequence of images of said hair after undergoing the selective treatment or being exposed to said event.

The synthesized image of the hair to be treated may be obtained by the method described above.

The synthesized image of the treated hair may be calculated by modifying a physical parameter of the untreated hair. The modification may depend on the treatment selected. To this end, the system may for example include a database including information reflecting the evolution of physical parameters of a hair as a function of treatments applied to the hair. The same applies to a hair exposed to a predetermined event.

Two treatments that may be selected for purposes of simulation may differ from each other at least in terms of the quantity of composition applied, the thickness of the layer of composition applied, the distribution of the composition on the hair, the duration of the treatment, the diameter of the crimping iron or the temperature of the crimping iron, for example 180° C. or 200° C.

A treatment whose impact is to be modeled may vary as a function of the arc length measured along the hair.

An image of sequence of images of the hair after treatment and an image or sequence of images of the hair before treatment may be displayed simultaneously on the same screen.

This method may further be used for example to simulate the mechanical effects of coating the hair or of a loss or uptake of moisture, linked for example to exposure of the hair to rain or sun. The effect of water may be to increase the bend and/or the density of the hair, for example.

By modeling the impact of such events on a treated hair, such a method may further be used to demonstrate the resistance of a hair conditioning composition or treatment to external climatic events, for example rain, wind or the action of the sun.

The methods described above may further be used to evaluate the effect of a composition as a function of the quantity thereof that was applied to the hair or remains on the hair after rinsing.

The increase in the weight of the hair after the application of a coating composition may be evaluated, for example.

The different behavior of a hair when dry or wet may also be evaluated.

For example, these evaluations may seek to determine a reduction or an increase in the volume of the head of hair.

Modeling the impact of a treatment may be used to develop new hair-care treatments or compositions, for example. Such modeling may further be used for promotional or educational purposes, for example to explain to a customer or a hairdresser the impact of a treatment on the appearance and/or the behavior of the hair.

Hairdresser Training

Figure 6:
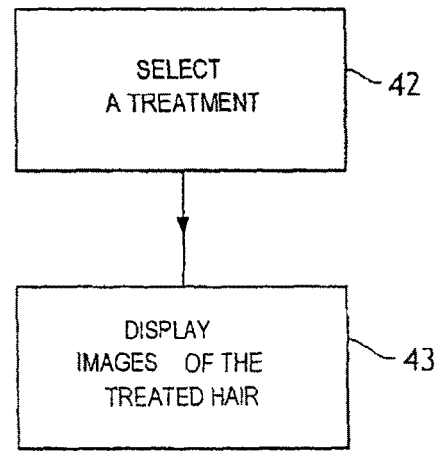

Exemplary embodiments of the invention consist in a hairdresser training method, as shown in FIG. 6, including the following steps:
- in the step 42, selecting a treatment to be applied to the hair;
- in the step 43, displaying a virtual image or sequence of images of a hair that has undergone the selected treatment, the image(s) being generated by the method defined above.

Thus the effects of a treatment on the hair may be assessed more easily.

Product

The invention may be used to associate with hair-care compositions, information representing physical parameters characteristic of the hair.

Figure 8:
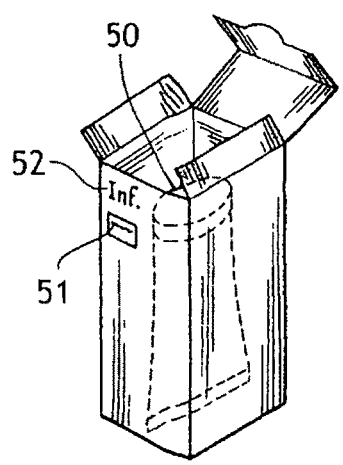
FIG. 8 represents diagrammatically an example of a product according to the invention.
Figure 9:
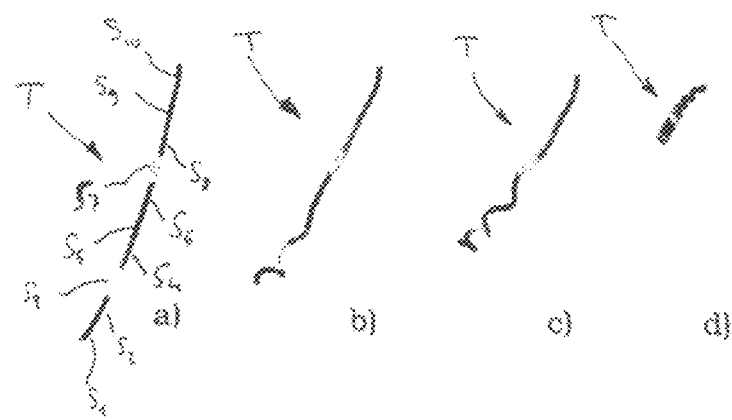
FIG. 9 is a diagram showing an example of the rod mechanical model applied to a rod made up of ten rod elements.

For example, FIG. 8 shows a product including:
- a hair-care composition 50 in a container;
- an image 51 generated by the method of the invention; and
- information 52 associated with the image, that may represent physical parameters of the hair.

The hair-care composition 50 may be a permanent waving, crimping, straightening, and/or decrimping composition for the hair, for example, or a composition for shaping the hair, for example a hair gel. The composition may further be a shampoo. The hair-care composition may act on the shape of the hair but also, where applicable, on its color and/or its brilliance. This action may be more or less durable and/or more or less reversible.

The information 52 may indicate the effectiveness of the composition, for example in terms of variation of physical parameters linked to the shape of the hair or to characteristics of a head of hair for which it is suitable and/or a result that can be achieved.

The product may further include information associated with the composition and representing parameters not linked to the shape of the hair, for example. A parameter that is not linked to the shape of the hair may represent the color and/or the brilliance of the hair, for example, before or after treatment.

This further information may for example indicate the coordinates in a colorimetric space such as the CIE lab or Munsell space, for example, of the color of the head of hair to be treated or looked up or a shade on a scale of shades.

The information may be expressed in various forms, directly apparent to a person or otherwise.

The information may include an alphanumeric character, a symbol, a drawing, a color, or a bar code.

The images may be images of hairs lying in a plane or alternatively perspective images of hairs not entirely contained within one plane.

Experimental Results

Figure 10:
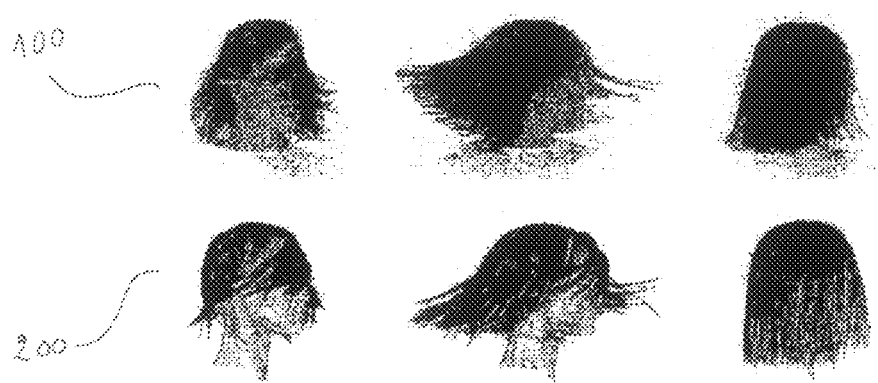
FIG. 10 shows a comparison between an animated sequence showing the movement of a real head of hair and of a virtual head of hair obtained by the method of the invention.
Figure 11:
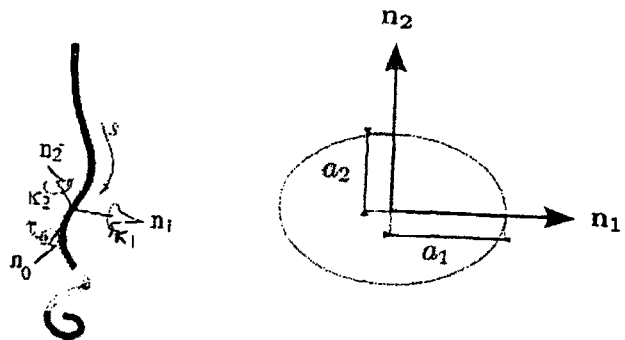
FIG. 11 shows a frame associated with a director hair.
Figure 12:
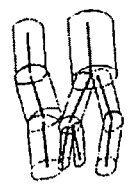
FIG. 12 shows examples of surface envelopes for collision detection purposes.

FIG. 10 shows a comparison between a sequence 100 of images of a real head of hair in movement and a sequence 200 of images of a virtual head of hair obtained by the method of the invention.

Figure 13A:
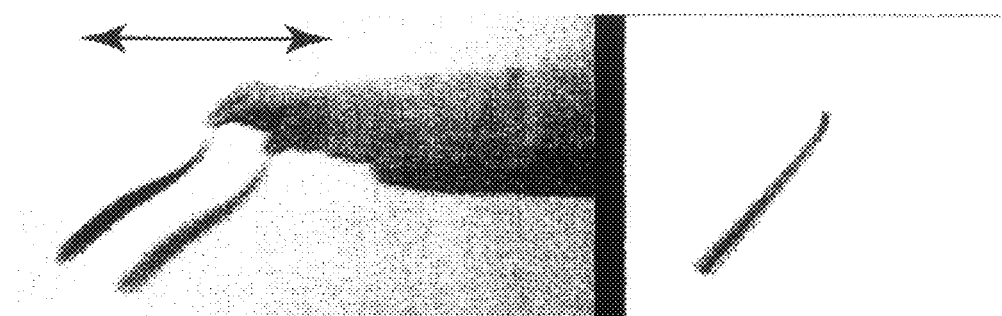
FIG. 13A to 13C are examples of hair simulation.
Figure 13A:
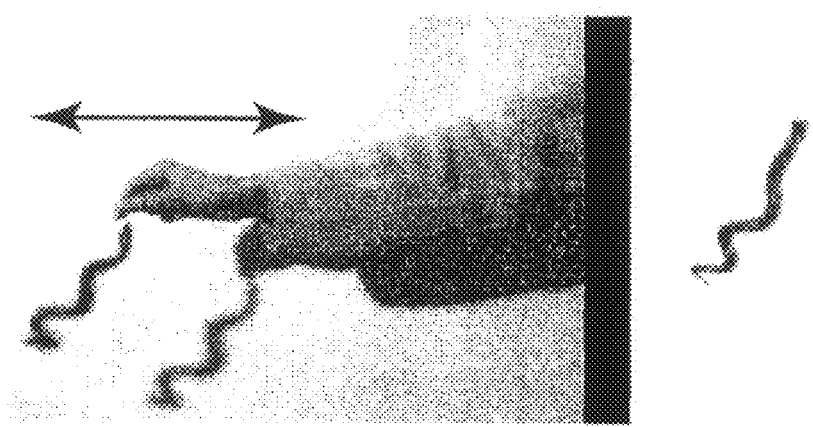
Figure 13B:
Figure 13B:
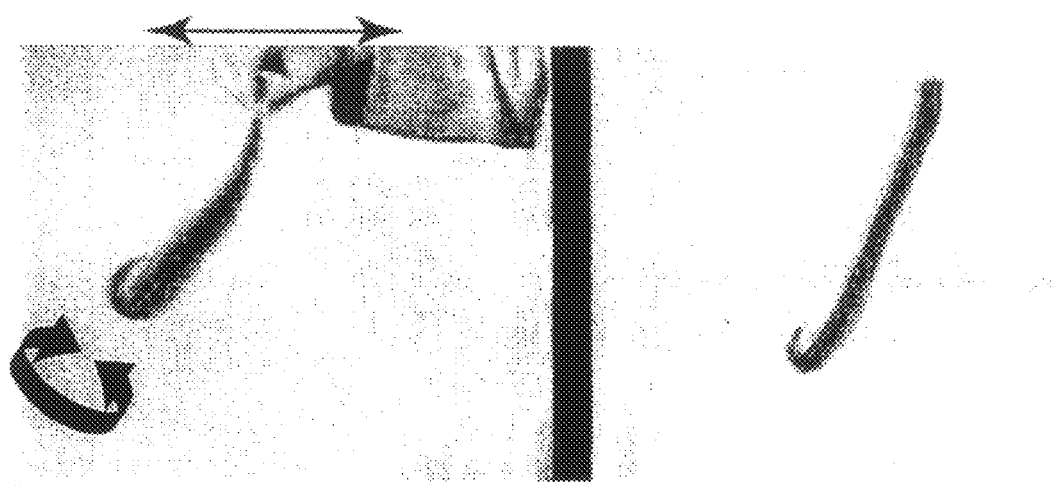
Figure 13C:
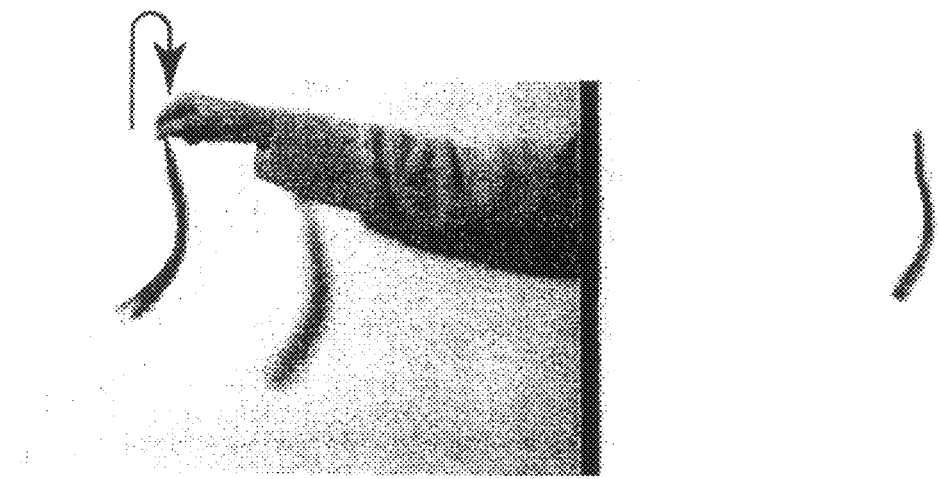

FIGS. 13A to 13B show various examples or images of real hair versus simulated hair.

The invention is not limited to the examples that have just been given.

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

Throughout the description, including in the claims, the expression "comprising a" should be understood as being synonymous with "comprising at least one", unless specified to the contrary. "A hair" should be understood as being synonymous with "at least one hair".

What is claimed is:

1. A method of generating at least one synthesized image of at least a portion of a head of hair in movement by at least one electronic processor, the method comprising:
calculating a shape of at least one director hair by applying to the at least one director hair at least one mechanical model of an inextensible rod having inertia and stiffnesses in twisting and in bending, wherein at least one envelope surface is calculated for each director hair for collision detection between hairs and between hairs and a body or an object; and
generating at least one virtual image of the at least one portion of the head of hair from the shape of the at least one director hair.

2. A method according to claim 1, in which the shape is calculated for a plurality of director hairs.

3. A method according to claim 1, in which the rod mechanical model comprises a succession of rod elements, in which each rod element has uniform material twist and curvatures.

4. A method according to claim 1, in which collisions are detected between the envelope surfaces.

5. A method according to claim 4, in which a distance between at least two main axes of two different envelope surfaces is tracked over time.

6. A method according to claim 5, in which collisions are detected between at least two envelope surfaces or between an envelope surface and an outside surface representative of a body or an object, as follows:
when the length of each of the tracking segments is greater than a determined value $dist_{max}$, there is no collision and tracking over time of the tracking segments of at least two envelope surfaces is interrupted, and the distances between a plurality of pairs of points in the vicinity of the previously observed pairs of points are then tracked; and
when the length of each of the tracking segments is less than a determined value $dist_{min}$, elastic penalty forces are applied to the rod mechanical model, which penalty forces are proportional to the degree of interpenetration between the surfaces in collision.

7. A method according to claim 6, in which each penalty force includes a normal component that is elastic and a tangential component modeling viscous friction.

8. A method according to claim 6, in which the penalty forces applied during a collision between at least one envelope surface of at least one other envelope surface or an outside surface are a function of the direction of relative displacement of the surfaces in collision as projected onto the main axis of an envelope surface.

9. A method according to claim 1, in which the rod mechanical model incorporates at least one mechanical dissipation parameter modeling the damping of the movement of the at least one director hair.

10. A method according to claim 1, in which the rod mechanical model incorporates at least one physical parameter associated with a mechanical property of at least one hair of said at least one portion of a head of hair, selected from the following list: hair length (L); hair radius(ii); main radii ($r_x$, $r_y$) of the hair, in particular the ellipticity of the hair; spontaneous twisting and bending ($\tau''$, $\kappa_1''$, $\kappa_2''$) of the hair about one or more axes; density ($\rho$); linear mass of the hair; clamping angle(s) ($\theta_0$) of the hair in the scalp; bending stiffness(es) ($EI_1$ $EI_2$) of the hair; Young's modulus ($\mu J$); Poisson's ratio (nu); spontaneous twisting ($\tau''$) of the hair; twisting stiffness ($\mu J$); and porosity of the hair.

11. A method according to claim 10, wherein at least one of the physical parameters varies as a function of the arc length measured along the hair.

12. A method according to claim 1, in which at least one synthesized image is generated of at least a portion of a head of hair in movement from at least two source images of at least a portion of a real head of hair.

13. A method according to claim 1, wherein said at least one synthesized image is displayed on the same screen as at least one element for adjusting a simulation parameter of said rod mechanical model.

14. A method according to claim 13, wherein a user is enabled to select at least one simulation parameter of said rod mechanical model as a function of at least one physical characteristic of a portion of a real head of hair, in particular as a function of the smooth or curly appearance of the portion of a real head of hair.

15. A method of characterizing a hair according to claim 1, the method comprising:
allowing a comparison to be made between an image of a head of hair to be characterized and an image of a virtual head of hair; and
modifying at least one physical parameter of the virtual head of hair as a function of the comparison in order to increase the resemblance between the head of hair to be characterized and the image of the virtual head of hair.

16. A method of prescribing a hair care composition according to claim 1, comprising:
determining at least one characteristic of a head of hair for treatment by comparing the real head of hair with a virtual head of hair; and
prescribing a hair care composition as a function of the determined characteristic.

17. A hair care treatment method according to claim 1, comprising:
associating with a customer information associated with a dynamic behavior of that customer's hair by comparing it with a virtual head of hair;
as a function of that information, selecting at least one hair care composition identified by corresponding identifiers from a set of compositions; and
treating the customer using the selected composition(s).

18. A method of modeling the impact of a treatment or an external event applied to a head of hair according to claim 1, comprising:
displaying a synthesized image of at least a portion of the head of hair; and
displaying a synthesized image of said at least one portion of the head of hair after being subjected to the treatment or the external event.

19. A method according to claim 1, in which the rod mechanical model incorporates at least one physical parameter associated with a mechanical property of at least one hair of said at least one portion of a head of hair, selected from the list: density; linear density of the hair; claiming angle(s) of the hair in the scalp; Young's modulus; Poisson's ratio; spontaneous twisting of the hair; and the porosity of the hair.

20. A method of generating a sequence of synthesized images of a head of hair in movement by at least one electronic processor, comprising:
representing at least one hair or group of hairs by at least one piecewise helical rod made up of one or more helical portions; and
animating said at least one helical rod by using Lagrange's equations of motion on generalized coordinates.

* * * * *